US011655320B2

(12) United States Patent
Nickerl et al.

(10) Patent No.: US 11,655,320 B2
(45) Date of Patent: *May 23, 2023

(54) MIXTURE OF RADICALLY CURABLE COMPOUNDS AND USE THEREOF

(71) Applicant: Hilti Aktiengesellschaft, Schaan (LI)

(72) Inventors: Georg Nickerl, Diessen am Ammersee (DE); Jens Bunzen, Augsburg (DE); Beate Gnass, Gersthofen (DE); Gerald Gaefke, Augsburg (DE); Thomas Bürgel, Landsberg (DE); Klaus Schaefers, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 367 days.

This patent is subject to a terminal disclaimer.

(21) Appl. No.: 16/938,536

(22) Filed: Jul. 24, 2020

(65) Prior Publication Data

US 2020/0354495 A1 Nov. 12, 2020

Related U.S. Application Data

(63) Continuation of application No. 16/619,844, filed as application No. PCT/EP2018/066439 on Jun. 20, 2018, now Pat. No. 10,829,578.

(30) Foreign Application Priority Data

Jul. 3, 2017 (EP) .................................... 17179288

(51) Int. Cl.
*C08F 222/22* (2006.01)
*E04B 1/41* (2006.01)
*C08G 18/32* (2006.01)
*C08G 18/10* (2006.01)
*C08G 18/76* (2006.01)
*C08G 18/67* (2006.01)
*C08L 75/16* (2006.01)
*C08G 18/24* (2006.01)
*C08G 18/73* (2006.01)

(52) U.S. Cl.
CPC ............ *C08F 222/22* (2013.01); *C08G 18/10* (2013.01); *C08G 18/246* (2013.01); *C08G 18/3206* (2013.01); *C08G 18/672* (2013.01); *C08G 18/73* (2013.01); *C08G 18/7642* (2013.01); *C08L 75/16* (2013.01); *E04B 1/4157* (2013.01)

(58) Field of Classification Search
CPC .............. C08F 222/22; C08G 18/3206; C08G 18/10; C08G 18/7642; C08G 18/672; C08G 18/246; C08G 18/73; C08L 75/16; E04B 1/4157
See application file for complete search history.

(56) References Cited

U.S. PATENT DOCUMENTS

| 3,066,112 | A | 11/1962 | Bowen |
| 4,755,571 | A | 7/1988 | Irving et al. |
| 5,162,547 | A | 11/1992 | Roth et al. |
| 5,731,366 | A | 3/1998 | Moench et al. |
| 7,091,258 | B2 | 8/2006 | Neubert et al. |
| 9,994,655 | B2 | 6/2018 | Gaefke et al. |
| 10,829,578 | B2* | 11/2020 | Nickerl ............... C08G 18/672 |
| 2004/0092656 | A1 | 5/2004 | Vogel et al. |
| 2006/0051593 | A1 | 3/2006 | Peeler et al. |
| 2010/0130682 | A1 | 5/2010 | Hinamoto et al. |
| 2010/0291507 | A1 | 11/2010 | Abdelgany |
| 2015/0232595 | A1 | 8/2015 | Leitner et al. |
| 2015/0252124 | A1 | 9/2015 | Gaefke et al. |
| 2016/0145376 | A1 | 5/2016 | Chen et al. |
| 2016/0152754 | A1 | 6/2016 | Pfeil |
| 2021/0155580 | A1 | 5/2021 | Nickerl et al. |

FOREIGN PATENT DOCUMENTS

| CN | 1500129 | | 5/2004 |
| CN | 104812788 | | 7/2015 |
| CN | 105531296 | | 4/2016 |
| DE | 284 890 | | 10/1983 |
| DE | 41 31 457 | | 3/1993 |
| EP | 0508183 | * | 6/1995 |
| EP | 0 713 015 | | 5/1996 |
| EP | 2 922 890 | | 9/2015 |
| GB | 1006587 | | 10/1965 |

(Continued)

OTHER PUBLICATIONS

"Composites properties and classification", https://e-plastic.ru/specialistam/composite/kompozicionnye-materialy/, published in Wayback Internet Archive Machine Mar. 25, 2014, with English translation, 25 pages.
"Molecular structure", http://www.chem.msu.ru/rus/teaching/kolman/14.htm, published in Wayback Internet Archive Machine Jan. 17, 2017, with English translation, 6 pages.
Office Action dated Nov. 5, 2020 in U.S. Appl. No. 16/613,182.
International Search Report dated Aug. 1, 2018 in PCT/EP2018/066215 with English translation, 5 pages.
Written Opinion dated Aug. 1, 2018 in PCT/EP2018/066215, 5 pages
SciFinder file for GAS registry No. 60453-84-1, downloaded on Aug. 5, 2020 (Year: 2020).

(Continued)

*Primary Examiner* — Patrick D Niland
(74) *Attorney, Agent, or Firm* — Grüneberg and Myers PLLC

(57) ABSTRACT

A mixture includes at least two radically curable compounds as a backbone resin, and is useful in reactive resins. In particular, the mixture reduces the viscosity of such reactive resin-containing mixtures and thus the dispensing forces required for ejecting the reactive resin components produced therefrom. The mixture also increases the performance of the reactive resins containing such mixtures and of the reactive resin components produced therefrom. Further, said reactive resins and the reactive resin components thereof are useful for construction purposes, in particular for chemical fastening.

15 Claims, No Drawings

(56) References Cited

FOREIGN PATENT DOCUMENTS

| | | |
|---|---|---|
| GB | 1414476 | 11/1975 |
| JP | 50-37701 | 12/1975 |
| JP | 2-226248 | 9/1990 |
| JP | 6-263501 | 9/1994 |
| JP | 8-277818 | 10/1996 |
| JP | 2004-074132 | 4/2014 |
| RU | 2015119529 | 12/2016 |
| WO | 2014/079854 | 5/2014 |
| WO | 2014/106799 | 7/2014 |

OTHER PUBLICATIONS

SciFinder file for CAS Registry No. 106-91-2 (Downloaded on Dec. 22, 2020) (Year: 2020).
U.S. Office Action dated Mar. 4, 2022 in U.S. Appl. No. 16/610,511, 14 pages.
U.S. Appl. No. 16/610,511, filed Nov. 3, 2019, 2021/0155580, Nickerl et al.
International Search Report dated Sep. 17, 2018 in PCT/EP2018/066439 with English translation (5 pages).
Written Opinion dated Sep. 17, 2018 in PCT/EP2018/066439.
Van Landuyt et al., "Systematic Review of the Chemical Composition of Contemporagy Dental Adhesives", Biomaterials 28, (2007), pp. 3757-3785.
Author unknown, the BASF product bulletin "Lupranat M 20 S", version 08, edition of Aug. 2019, pp. 1-3 from https:// chemicals.basf.com/global/en/Monomers/isocyanates-and-polyols/isocyanates.html.

\* cited by examiner

MIXTURE OF RADICALLY CURABLE COMPOUNDS AND USE THEREOF

CROSS-REFERENCE TO RELATED APPLICATIONS

This application is a continuation of U.S. application Ser. No. 16/619,844, filed on Dec. 5, 2019, which is a National Stage entry under § 371 of International Application No. PCT/EP2018/066439, filed on Jun. 20, 2018, and which claims the benefit of European Application No. 17179288.0, filed on Jul. 3, 2017, the content of all of which are hereby incorporated by reference in their entireties.

BACKGROUND OF THE INVENTION

Field of the Invention

The invention relates to mixtures that comprise at least two radically curable compounds as a backbone resin, the use thereof in reactive resins, in particular for reducing the viscosity of such reactive resin-containing mixtures and thus the dispensing forces required for ejecting the reactive resin components produced therefrom and for increasing the performance of the reactive resins containing such mixtures and of the reactive resin components produced therefrom. The invention further relates to the use of said reactive resins and the reactive resin components thereof for construction purposes, in particular for chemical fastening.

Discussion of the Background

The currently used radically curable fastening compositions are based on unsaturated polyesters, vinyl ester urethane resins and epoxy acrylates. These are usually two-component reactive resin systems, one component containing the resin ("component (A)") and the other component ("component (B)") containing the curing agent. Other constituents such as inorganic fillers and additives, accelerators, stabilizers and reactive diluents may be contained in one and/or the other component. Mixing the two components initiates curing of the mixed components. When the fastening compositions are used for fastening anchoring elements in boreholes, the curing takes place in the boreholes.

Such a fastening composition is known from DE 3940138 A1, for example. This describes fastening compositions based on cycloaliphatic group-carrying monomers which may additionally contain unsaturated polyester or vinyl ester resins. However, such mortar compositions have relatively high viscosities, which limits their use, especially for chemical fastening technology.

On construction sites, there may be relatively large temperature ranges of, for example, −25° C. to +45° C., depending on the season and/or geographical location. Therefore, the high viscosity of the curable fastening compositions described at the outset and their resulting thixotropic behavior can lead to problems during use. Heavy demands are therefore placed on the field of application, in particular application in different temperature ranges, of such fastening compositions.

On the one hand, in the low temperature range a sufficiently low viscosity of the composition should be ensured during ejection, so that the composition has a flow resistance that is not too high. This is to ensure that the composition can be processed, for example, using a hand dispenser, e.g. injected into the borehole. In particular when using static mixers, a low viscosity is important for correctly mixing the two components.

On the other hand, the composition should be sufficiently stable in the higher temperature range, so as to prevent the individual components from draining after the dispenser is relaxed and so that the composition does not run out of the borehole during overhead mounting.

Another problem caused by temperature fluctuations is that the radical chain polymerization does not take place consistently. The cured mortar composition thus has a fluctuating/irregular and often insufficient homogeneity, which is reflected in fluctuations of the load values and often also in generally low load values. For example, at temperatures below 20° C., an increase in viscosity may lead to premature solidification of the fastening composition. As a result, the turnover in the radical chain polymerization is much lower, which contributes to a reduction of the load values.

Since temperature fluctuations on the construction site cannot be avoided, there is still a need for two-component reactive resin systems which ensure homogeneity and the associated reproducibility of the load values both at high and at low temperatures.

In order to address the above-mentioned problems, the proportion of reactive diluents is increased in the fastening compositions found on the market, which ultimately leads to a reduction in the resin content in the composition. The proportion of reactive diluents is often at least 50%, based on the reactive resin.

However, the increase in the proportion of reactive diluents also leads to some disadvantages, which are particularly noticeable in the use of the fastening composition for fastening anchoring means in boreholes.

A significant disadvantage is that the reduction in the proportion of high-viscosity resin, which is essential to the performance of the composition, adversely affects the performance of the cured fastening composition.

Another disadvantage is greater shrinkage of the fastening composition after curing, which may also adversely affect the performance of the cured fastening composition. This is attributed to the fact that the contact between the cured fastening composition and the undercuts formed in the borehole wall during the construction of the borehole, which occur in particular when using impact drills, is significantly reduced. This usually also prevents the use of fastening compositions based on radically curable compounds in diamond-drilled holes.

Another disadvantage is that, depending on the type of reactive diluent, the proportion of volatile organic compounds (VOCs) in the compositions can increase. This can lead to evaporations from the fastening composition and/or the cartridge and, if appropriate, to a resulting drop in performance of the cured fastening composition. Some of these compounds may also be hazardous to health and/or are therefore subject to labeling.

The number of usable reactive diluents is also low, since there are currently only a few available reactive diluents on the market. The available reactive diluents bear, in addition to the radically curable functional groups, no other functional groups or only a very limited selection thereof, and therefore generally have only a small amount of influence on the property of the cured fastening composition. As a result, the fastening compositions are often developed for specific uses, such as specific temperature ranges, or for use in specific substrates. This suggests an immense development outlay in order to be able to address new and broader applications with the fastening compositions.

Hitherto, special products of which the formulations are adapted to the specific application temperatures have been produced. There are products that are intended for a wide temperature range, but have the same properties over the entire range. Especially in the boundary regions, i.e. at low and at high temperatures, impairments in processability, in the curing of the composition, or in the properties of the cured composition must be expected. There is no known fastening composition that covers a very wide temperature range without having to accept losses in the boundary regions.

There is therefore a need for fastening compositions whose performance and properties cannot be influenced by the use of reactive diluents, but by the resin constituent.

SUMMARY OF THE INVENTION

An object of the present invention is to influence the properties of a reactive resin master batch and a reactive resin prepared therefrom, which is due solely to the structure of the backbone resin, but not to the presence of additional compounds such as reactive diluents or additives. The object of the present invention is principally to control the properties of a two- or multi-component reactive resin system by means of the containing backbone resin. In particular, it is the object of the present invention to provide fastening compositions, such as two- or multi-component reactive resin systems, the viscosity of which is less dependent on the application temperature of the fastening composition, which have a low viscosity, especially at low temperatures, e.g. below 20° C., and thus allow the provision of reactive resin systems which have lower dispensing forces at application temperatures below 20° C., in particular at application temperatures below 10° C., and are therefore more user-friendly than the conventional fastening systems.

Another object of the invention is to provide a fastening composition which has lower dispensing forces of the reactive resin component and, at the same time, higher load values of the cured fastening composition than conventional compositions.

Yet another object of the present invention is to provide a fastening composition which avoids highly hazardous ingredients in the reactive resin component and is optionally also free of labeling. In particular, it is the object to reduce the proportion of reactive diluents in reactive resins for chemical fastening without needing to dispense with the function or functions thereof and positive effects thereof on the cured fastening composition.

Yet another object of the present invention is to provide a fastening composition which is characterized by good processability, curing behavior and low shrinkage over a wide temperature range.

This object is achieved by a mixture of at least two compounds as described below and the use thereof, a reactive resin, and a reactive resin component according to various embodiments below.

DETAILED DESCRIPTION OF THE INVENTION

This object is achieved by a mixture according to claim 1 and the use thereof according to claims 17 to 19, a reactive resin according to claim 20 and a reactive resin component according to claim 21.

Surprisingly, it has been found that by using a mixture of at least two compounds selected from certain low-viscosity urethane methacrylate compounds, certain low-viscosity epoxy methacrylate compounds and certain branched urethane methacrylate compounds, as the backbone resin, the temperature range in which the viscosity of a reactive resin containing this mixture and a reactive resin component obtainable therefrom remains largely unaffected by the temperatures is large.

Advantageously, the present invention allows low dispensing forces in a reactive resin system at low application temperatures, in comparison with conventional systems. By using mixtures of at least two compounds selected from certain low-viscosity urethane methacrylate compounds, certain low-viscosity epoxy-methacrylate compounds and certain branched urethane-methacrylate compounds as backbone resin in reactive resins, it is thus possible to achieve the dispensing forces of a reactive resin system both at 20° C. and at lower temperatures, for example, at temperatures below 10° C., preferably below 5° C., without requiring a high proportion of reactive diluents.

It has furthermore been found that the use of mixtures of at least two compounds selected from certain low-viscosity urethane methacrylate compounds, certain low-viscosity epoxy methacrylate compounds, and certain branched urethane methacrylate compounds can reduce the proportion of reactive diluents in reactive resins for chemical fastening without needing to dispense with the function or functions thereof and positive effects thereof on the cured fastening composition, since the proportion of backbone resin can be increased. This makes it possible both to increase the load values of a cured composition and to achieve higher load values at higher temperatures, for example at 80° C. with the same proportion of backbone resin.

The invention is based on the finding that it is possible to replace the resins previously used in fastening compositions with smaller backbone resins in order to reduce the proportion of reactive diluents and to transfer the functionality of the reactive diluents to the backbone resins. The aim of the invention was to provide a modular system which makes it possible to assemble the mixture of radically curable compounds as a backbone resin based on the desired properties of the fastening composition.

For better understanding of the invention, the following explanations of the method of producing a reactive resin and the terminology used herein are considered to be useful.

The production process for a reactive resin with a mixture of curable compounds as the backbone resin typically proceeds as follows, explained here by the example of a mixture of an MDI-based urethane methacrylate and a 1,4-butanediol diglycidyl ether-based epoxy methacrylate:

1. Production of Backbone Resin/Reactive Resin Master Batch

A reactive resin master batch having an MDI-based urethane methacrylate as the backbone resin 1 is produced as follows:

Methanediphenyl diisocyanate (MDI) and hydroxypropyl methacrylate (HPMA) are reacted in the presence of a catalyst and an inhibitor (which serves to stabilize the backbone resin formed by the polymerization, often called a stabilizer or process stabilizer). This produces backbone resin 1.

A reactive resin master batch having a 1,4-butanediol-diglycidyl ether-based epoxy methacrylate as the backbone resin 2 is produced independently thereof as follows: 1,4-butanediol diglycidyl ether and methacrylic acid are reacted in the presence of a catalyst and an inhibitor. This produces backbone resin 2.

The reaction mixture obtained after completion of the reaction is referred to as a reactive resin master batch. This is not further processed, i.e. the backbone resin is not isolated.

2. Production of Reactive Resins

After completion of the reaction to form the backbone resin, an accelerator-inhibitor system, i.e. a combination of one or more additional inhibitors and one or more accelerators and optionally a reactive diluent, are added to the two reactive resin master batches.

This produces the reactive resin 1 and, independently of this, the reactive resin 2.

The accelerator-inhibitor system serves to set the reactivity of the reactive resin, i.e. to set the time by which the reactive resin is not fully cured after addition of an initiator and, therefore, by which time a dowel mass mixed with the reactive resin remains processable after mixing with the initiator.

The inhibitor in the accelerator-inhibitor system may be the same as the inhibitor in the production of the backbone resin, if it is also capable of setting the reactivity, or another inhibitor, if it does not have both functions. 4-Hydroxy-2,2,6,6-tetramethyl-piperdinyl-1-oxyl (TEMPOL) for example may be used for setting the reactivity as a stabilizer and as an inhibitor.

3. Production of Mixture

The two reactive resins 1 and 2 are mixed, resulting in a reactive resin containing the backbone resin 1 and the backbone resin 2.

Alternatively, it is also possible to mix the two master batches before the production of the reactive resin and then add the other ingredients for the production of the reactive resin.

4. Production of Reactive Resin Component

In order to use the reactive resin containing backbone resin 1 and backbone resin 2, for construction purposes, in particular for chemical fastening, one or more inorganic aggregates, such as additives and/or fillers, are added after the production of the reactive resin.

As a result, the reactive resin component is obtained.

Within the meaning of the invention:

"backbone resin" means a typically solid or high-viscosity radically polymerizable resin which cures by polymerization (e.g. after addition of an initiator in the presence of an accelerator) and is usually present without reactive diluents and without further purification and thus may contain impurities;

"reactive resin master batch" means the reaction product of the reaction for producing the backbone resin, i.e. a mixture of backbone resin, reactive diluents and optionally other constituents of the reaction mixture;

"reactive resin" means a mixture of a reactive resin master batch, at least one accelerator and at least one inhibitor (also referred to as an accelerator-inhibitor system), at least one reactive diluent and optionally further additives; the reactive resin is typically liquid or viscous and can be further processed to form a reactive resin component; the reactive resin is also referred to herein as a "resin mixture";

"inhibitor" means a substance which suppresses unwanted radical polymerization during the synthesis or storage of a resin or a resin-containing composition (these substances are also referred to in the art as "stabilizers") or which delays the radical polymerization of a resin after addition of a initiator, usually in conjunction with an accelerator (these substances are also referred to in the art as "inhibitors"—the meaning of each term is apparent from the context);

"accelerator" means a reagent which reacts with the initiator so that larger quantities of free radicals are produced by the initiator even at low temperatures, or which catalyzes the decomposition reaction of the initiator;

"reactive diluents" means liquid or low-viscosity monomers and backbone resins which dilute other backbone resins or the reactive resin master batch and thereby impart the viscosity necessary for application thereof, which contain functional groups capable of reacting with the backbone resin, and which for the most part become a constituent of the cured composition (e.g. of the mortar) in the polymerization (curing); reactive diluents are also referred to as co-polymerizable monomers;

"reactive resin component" means a liquid or viscous mixture of reactive resin and fillers and optionally further components, e.g. additives; typically, the reactive resin component is one of the two components of a two-component reactive resin system for chemical fastening;

"initiator" means a substance which (usually in combination with an accelerator) forms reaction-initiating radicals;

"hardener component" means a composition containing an initiator for the polymerization of a backbone resin; the hardener component may be solid or liquid and may contain, in addition to the initiator, a solvent and fillers and/or additives; typically the hardener component, in addition to the reactive resin component, is the other of the two components of a two-component reactive resin chemical fastening system;

"mortar composition/fastening composition" means the composition which is obtained by mixing the reactive resin component with the hardener component and can be used as such directly for chemical fastening;

"reactive resin system" generally means a system comprising components stored separately from one another such that the backbone resin contained in a component is cured only after the components are mixed;

"two-component system" or "two-component reactive resin system" means a reactive resin system comprising two components stored separately from one another, a reactive resin component (A) and a hardener component (B), such that the backbone resin contained in the reactive resin component is cured only after the two components are mixed;

"multi-component system" or "multi-component reactive resin system" means a reactive resin system comprising a plurality of components stored separately from one another, including a reactive resin component (A) and a hardener component (B), such that the backbone resin contained in the reactive resin component is cured only after all the components are mixed;

"construction purposes" means any use for the construction and maintenance or repair of components and structures, as polymer concrete, as a resin-based coating composition or as a cold-curing road marking; in particular, the reinforcement of components and structures, such as walls, ceilings or floors, the fastening of components, such as slabs or blocks, e.g. made of stone, glass or plastics material, on components or structures, for example by bonding (structural bonding) and very particularly the chemical fastening of anchoring means, such as anchor rods, bolts or the like in recesses, such as boreholes;

"chemical fastening" means (non-positive and/or positive) fastening of anchoring means, such as anchor rods, bolts, rebar, screws or the like, in recesses, such as boreholes, in particular in boreholes in various substrates, in particular mineral substrates such as those based on concrete, aerated concrete, brickwork, limestone, sandstone, natural stone, glass and the like, and metal substrates such as steel;

"aliphatic hydrocarbon group" means an acyclic and cyclic, saturated or unsaturated hydrocarbon group that is not aromatic (PAC, 1995, 67, 1307; Glossary of class names of organic compounds and reactivity intermediates based on structure (IUPAC Recommendations 1995));

"aromatic hydrocarbon group" means a cyclic, planar hydrocarbon group having an aromatic system, which group, due to its delocalized electron system, is more energetically favorable than its non-aromatic mesomers and therefore is more chemically stable (PAC, 1995, 67, 1307; Glossary of class names of organic compounds and reactivity intermediates based on structure (IUPAC Recommendations 1995) page 1319)

"aromatic-aliphatic hydrocarbon group" means a hydrocarbon group having an aromatic hydrocarbon group to which one or more aliphatic hydrocarbon group(s) is bonded, the aliphatic hydrocarbon group serving as a bridge to a functional group, so that the functional group is not bonded directly to the aromatic hydrocarbon group;

"aromatic diisocyanate" means a compound in which the two isocyanate groups are bonded directly to an aromatic hydrocarbon skeleton;

"aromatic-aliphatic diisocyanate" means a compound having an alkyl-substituted benzene ring as the aromatic nucleus, the two isocyanate groups not being bonded directly to the aromatic nucleus, but to the alkylene groups, so that the alkylene groups serve as alkylene bridges;

"(meth)acrylic . . . / . . . (meth)acarylic . . . " means both the "methacrylic . . . / . . . methacrylic" and the "acrylic . . . / . . . acrylic . . . " compounds; "methacrylic . . . / . . . methacrylic" compounds are preferred in the present invention;

"a," "an," "any," as the indefinite article preceding a class of chemical compounds, e.g. preceding the word "urethane methacrylate," means that at least one, i.e. one or more compounds included under this class of chemical compounds, e.g. various urethane methacrylates, may be intended. In a preferred embodiment, this article means only a single compound;

"at least one" means numerically "one or more." In a preferred embodiment, the term means numerically "one";

"contain" and "comprise" mean that further constituents may be present in addition to those mentioned. These terms are intended to be inclusive and therefore encompass "consist of." "Consist of" is intended to be exclusive and means that no further constituents may be present. In a preferred embodiment, the terms "contain" and "comprise" mean the term "consist of";

"approximately" or "approximately" before a numerical value means a range of ±5% of this value, preferably ±2% of this value, more preferably ±1% of this value, particularly preferably ±0% of this value (i.e. exactly this value);

a range limited by numbers means that the two extreme values and any value within this range are disclosed individually.

All standards cited in this text (e.g. DIN standards) were used in the version that was current on the filing date of this application.

A first subject of the invention is a mixture comprising at least two radically curable compounds selected from the group consisting of structures of the general formulas (I), (V) or (VII):

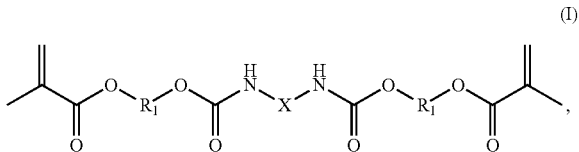

(I)

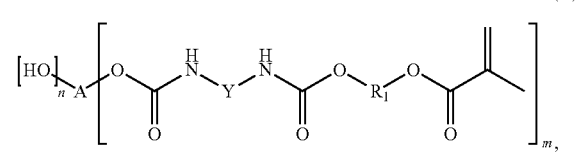

(V)

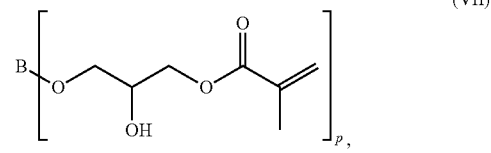

(VII)

in which
each $R_1$ is independently a branched or linear aliphatic $C_1$-$C_{15}$ alkylene group,
A is a linear or branched aliphatic $C_3$-$C_{10}$ alkylene group,
B is a linear, branched or cyclic aliphatic hydrocarbon group or an aromatic hydrocarbon group,
X is a divalent linear, branched or cyclic aliphatic or aromatic hydrocarbon group or a group of the formula (Z)

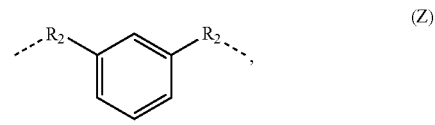

(Z)

in which $R_2$ is a divalent branched or linear aliphatic $C_1$-$C_6$ alkylene group,
Y is an aromatic hydrocarbon group,
n is a whole number greater than or equal to 0,
m is a whole number greater than or equal to 3, and
p is a whole number greater than or equal to 2.

A second object is the use thereof for producing a reactive resin or a reactive resin component for construction purposes. A third subject is the use thereof for reducing the viscosity of a reactive resin, or for reducing the dispensing forces of a reactive resin component or a reactive resin system, for construction purposes. A fourth subject is the use thereof for increasing the bond strength of a cured fastening composition. A fifth subject is a reactive resin comprising the mixture of radically curable compounds, an inhibitor, an accelerator and optionally a reactive diluent. A sixth subject is a reactive resin component for a reactive resin system comprising the reactive resin. A seventh subject is a reactive resin system comprising the reactive resin component and a hardener component that contains an initiator. An eighth subject is the use of the reactive resin or the reactive resin system for construction purposes.

According to the invention, the mixture comprises at least two radically curable compounds selected from the group consisting of structures of the general formulas (I), (V) or (VII)

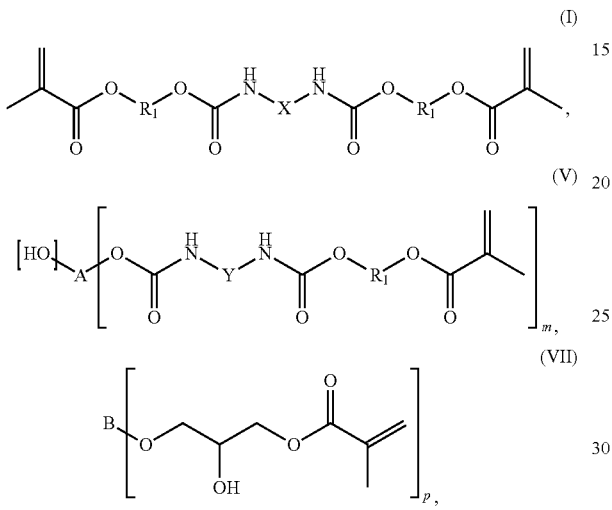

in which
each $R_1$ is independently a branched or linear aliphatic $C_1$-$C_{15}$ alkylene group,
A is a linear or branched aliphatic $C_3$-$C_{10}$ alkylene group,
B is a linear, branched or cyclic aliphatic hydrocarbon group or an aromatic hydrocarbon group,
X is a divalent linear, branched or cyclic aliphatic or aromatic hydrocarbon group or a group of the formula (Z)

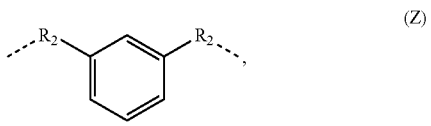

in which $R_2$ is a divalent branched or linear aliphatic $C_1$-$C_6$ alkylene group,
Y is an aromatic hydrocarbon group,
n is a whole number greater than or equal to 0,
m is a whole number greater than or equal to 3, and
p is a whole number greater than or equal to 2.

Radically Curable Compounds

Low-Viscosity Urethane Methacrylate Compounds According to the invention, the mixture as a radically curable compound may be a low-viscosity urethane methacrylate compound of the general formula (I)

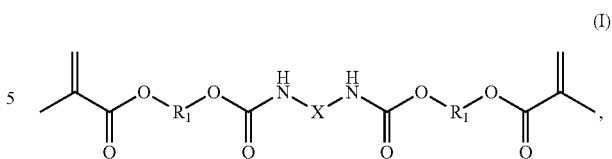

in which
X is (i) a divalent aromatic, (ii) a divalent linear, branched or cyclic aliphatic hydrocarbon group or (iii) a group of the formula (Z)

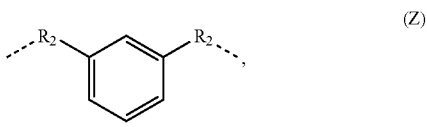

in which $R_2$ is a divalent branched or linear aliphatic $C_1$-$C_6$ alkylene group, and
each $R_1$ is independently a branched or linear aliphatic $C_1$-$C_{15}$ alkylene group.

(i) Divalent Aromatic Hydrocarbon Group X

The hydrocarbon group X may be a divalent aromatic hydrocarbon group, preferably a $C_6$-$C_{20}$ hydrocarbon group and more preferably a $C_6$-$C_{14}$ hydrocarbon group. The aromatic hydrocarbon group may be substituted, in particular by alkyl groups, of which alkyl groups having one to four carbon atoms are preferred.

In one embodiment, the aromatic hydrocarbon group contains a benzene ring which may be substituted.

In an alternative embodiment, the aromatic hydrocarbon group contains two fused benzene rings or two benzene rings bridged by an alkylene group such as a methylene or ethylene group. Both the benzene rings and the alkylene bridge may be substituted, preferably with alkyl groups.

The aromatic hydrocarbon group is derived from aromatic diisocyanates, "aromatic diisocyanate" meaning that the two isocyanate groups are bonded directly to an aromatic hydrocarbon skeleton.

Suitable aromatic hydrocarbon groups are divalent groups as obtained by removing the isocyanate groups from an aromatic diisocyanate, for example a divalent phenylene group from a benzene diisocyanate, a methylphenylene group from a toluene diisocyanate (TDI) or an ethylphenylene group from an ethylbenzene diisocyanate, a divalent methylene diphenylene group from a methylene diphenyl diisocyanate (MDI) or a divalent naphthyl group from a naphthalene diisocyanate (NDI).

Particularly preferably, the aromatic hydrocarbon group is derived from 1,3-diisocyanatobenzene, 1,4-diisocyanatobenzene, 2,4-diisocyanatotoluene, 2,6-diisocyanatotoluene, 2,4'-diphenylmethane diisocyanate, 4,4'-diphenylmethane diisocyanate or 1,5-diisocyanatonaphthalene.

(ii) Divalent Linear, Branched or Cyclic Aliphatic Hydrocarbon Group X

Alternatively, the hydrocarbon group X may be a divalent linear, branched or cyclic aliphatic hydrocarbon group, preferably selected from the group consisting of pentylene, hexylene, heptylene or octylene groups. Particularly preferably, in this embodiment the linear aliphatic hydrocarbon group X is a hexylene group.

In an alternative embodiment, the hydrocarbon group X is a divalent cycloaliphatic hydrocarbon group, which is preferably selected from the group consisting of 3-methylene-3,5,5-tetramethylcyclohexylene, methylenedicyclohexylene and 1,3-dimethylenecyclohexyl groups. Particularly preferable, in this embodiment the cycloaliphatic hydrocarbon group is a 3-methylene-3,5,5-trmethylcyclohexylene or 1,3-dimethylencyclohexylene group.

The aliphatic hydrocarbon group is derived from aliphatic diisocyanates, which includes linear and branched aliphatic diisocyanates and cycloaliphatic diisocyanates.

Suitable aliphatic hydrocarbon groups are divalent groups as obtained by removing the isocyanate groups from an aliphatic diisocyanate.

X is particularly preferably derived from aliphatic diisocyanates, such as 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane ($H_{12}MDI$), 1,3- and 1,4-bis(isocyanatomethyl)cyclohexane, bis-(isocyanatomethyl)-norbomane (NBDI), 4,4'-diisocyanato-3,3'-dimethyldicyclohexylmethane, 4,4'-diisocyanato-3,3',5,5'-tetramethyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetra-methyl-1,1'-bi(cyclohexyl), 1,8-diisocyanato-p-menthane, 1,3-diisocyanato adamantane, 1,3-dimethyl-5,7-diisocyanato adamantane.

(iii) Divalent Aromatic-Aliphatic Hydrocarbon Group X

The hydrocarbon group X may be a divalent aromatic-aliphatic hydrocarbon group Z of the formula (Z)

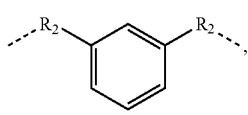

(Z)

in which $R_2$ is a divalent branched or linear aliphatic $C_1$-$C_6$ alkylene group, preferably $C_1$-$C_3$ alkylene group.

The aromatic-aliphatic hydrocarbon group is derived from aromatic-aliphatic diisocyanates, "aromatic-aliphatic diisocyanate" meaning that the two isocyanate groups are not bonded directly to the aromatic nucleus, but to the alkylene groups.

Suitable aromatic-aliphatic hydrocarbon groups are divalent groups as obtained by removing the isocyanate groups from an aromatic-aliphatic diisocyanate, such as isomers of bis(1-isocyanato-1-methylethyl)-benzene and xylylene diisocyanate (bis-(isocyanatomethyl)benzene), preferably from 1,3-bis(1-isocyanato-1-methylethyl)-benzene or m-xylylene diisocyanate (1,3-bis-(isocyanatomethyl)benzene).

Each $R_1$ is independently a branched or linear aliphatic $C_1$-$C_{15}$ alkylene group which may be substituted. $R_1$ is derived from hydroxyalkyl methacrylates and comprises divalent alkylene groups as obtained by removing the hydroxyl groups and the methacrylate group.

In one embodiment, the alkylene group $R_1$ is divalent.

In an alternative embodiment, however, it may also be trivalent or have a higher valency, so that the compound of formula (I) may also have more than two methacrylate groups, even if this is not directly apparent from formula (I).

The alkylene group $R_1$ is preferably a divalent linear or branched $C_1$-$C_{15}$ alkylene group, preferably a $C_1$-$C_6$ alkylene group and particularly preferably a $C_1$-$C_4$ alkylene group. These include in particular the methylene, ethylene, propylene, i-propylene, n-butylene, 2-butylene, sec-butylene, tert-butylene, n-pentylene, 2-pentylene, 2-methylbutylene, 3-methylbutylene, 1,2-dimethylpropylene, 1,1-dimethylpropylene, 2,2-dimethylpropylene, 1-ethylpropylene, n-hexylene, 2-hexylene, 2-methylpentylene, 3-methylpentylene, 4-methylpentylene, 1,2-dimethylbutylene, 1,3-dimethylbutylene, 2,3-dimethylbutylene, 1,1-dimethylbutylene, 2,2-dimethylbutylene, 3,3 dimethylbutylene, 1,1,2-trmethylpropylene, 1,2,2-trimethylpropylene, 1-ethylbutylene, 2-ethylbutylene, 1-ethyl-2-methylpropylene, n-heptylene, 2-heptylene, 3-heptylene, 2-ethylpentylene, 1-propylbutylene or octylene group, of which the ethylene, propylene and i-propylene group are more preferred. In a particularly preferred embodiment of the present invention, the two $R_1$ groups are identical and are an ethylene, propylene or i-propylene group.

The low-viscosity urethane methacrylate compounds according to the invention are obtained by reacting two equivalents of hydroxyalkyl methacrylate with at least one equivalent of diisocyanate. The diisocyanate and the hydroxyalkyl methacrylate are reacted in the presence of a catalyst and an inhibitor which serves to stabilize the formed compound.

Suitable hydroxyalkyl methacrylates are those having alkylene groups of one to 15 carbon atoms, where the alkylene groups may be linear or branched. Hydroxyalkyl methacrylates having one to 10 carbon atoms are preferred. Hydroxyalkyl methacrylates having two to six carbon atoms are more preferred, of which 2-hydroxyethyl methacrylate, 2-hydroxypropyl methacrylate (2-HPMA), 3-hydroxypropyl methacrylate (3-HPMA) and glycerol-1,3-dimethacrylate are particularly preferred. 2-hydroxypropyl methacrylate (2-HPMA) or 3-hydroxypropyl methacrylate (3-HPMA) are very particularly preferred.

Suitable aromatic diisocyanates are those having aromatically bound isocyanate groups, such as diisocyanatobenzene, toluene diisocyanates (TDI), diphenylmethane diisocyanates (MDI), diisocyanatonaphthalenes. These compounds may be present both as pure compounds and as optical isomers or mixtures of isomers in different compositions, which can optionally be separated in a conventional manner.

Particularly preferred aromatic diisocyanates are 1,4-diisocyanatobenzene, 2,4-diisocyanatotoluene, 2,6-diisocyanatotoluene, 2,4'-diphenylmethane diisocyanate, 4,4'-diphenylmethane diisocyanate and 1,5-diisocyanatonaphthalene.

Suitable diisocyanates are those having aliphatically and/or cycloaliphatically bonded isocyanate groups, such as 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane ($HM_{12}MDI$), 1,3- and 1,4-bis(isocyanatomethyl)cyclohexane, bis-(isocyanatomethyl)-norbornane (NBDI), 4,4'-diisocyanato-3,3'-dimethyldicyclohexylmethane, 4,4'-diisocyanato-3,3',5,5'-tetramethydicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetra-methyl-1,1'-bi(cyclohexyl), 1,8-diisocyanato-p-menthane, 1,3-diisocyanato adamantane, 1,3-dimethyl-5,7-diisocyanato adamantane.

Preferred diisocyanates are hexamethylene diisocyanate, isophorone diisocyanate and 1,3-bis(isocyanatomethyl)cyclohexane thereof.

Suitable aromatic-aliphatic diisocyanates are those having a benzene ring as an alkyl-substituted aromatic nucleus and having aliphatically bonded isocyanate groups, i.e. the isocyanate group is bonded to the alkylene groups, such as isomers of bis(1-isocyanato-1-methylethyl)-benzene and xylylene diisocyanate (bis-(isocyanatomethyl)benzene).

Preferred aromatic-aliphatic diisocyanates are 1,3-bis(1-isocyanato-1-methylethyl)-benzene or m-xylylene diisocyanate (1,3-bis-(isocyanatomethyl)benzene).

The compound of general formula (I) is preferably a compound of general formula (IIa), (IIb), (IIIa), (IIIb), (IIIc), (IVa) or (IVb):

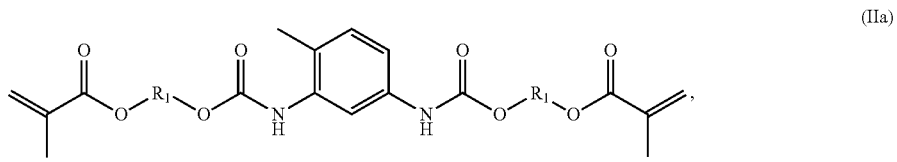

(IIa)

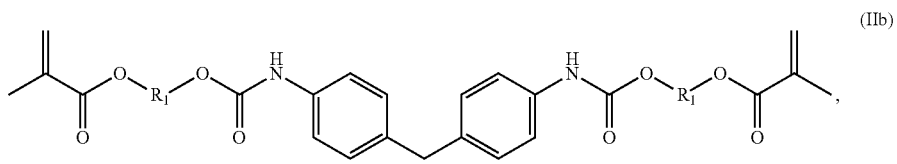

(IIb)

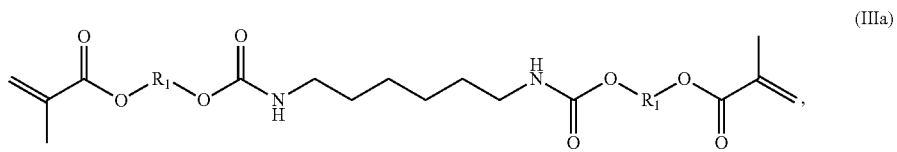

(IIIa)

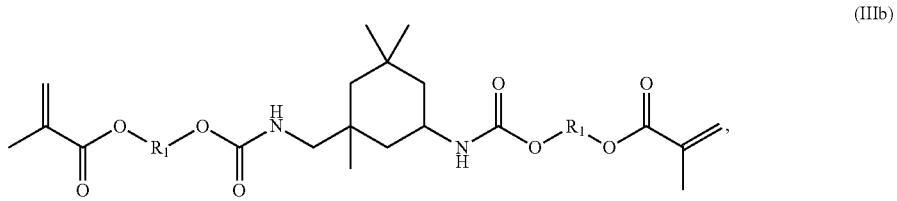

(IIIb)

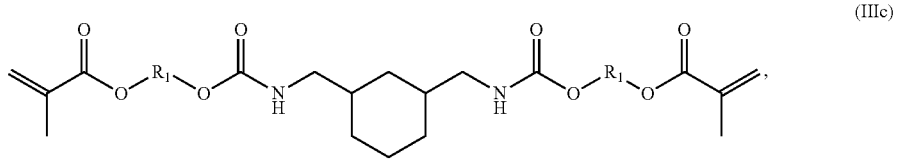

(IIIc)

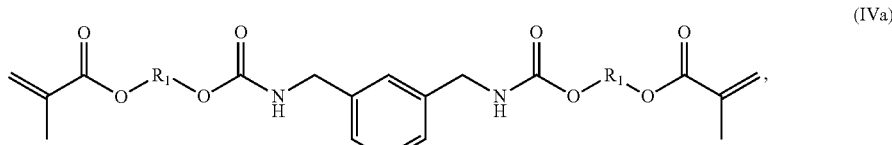

(IVa)

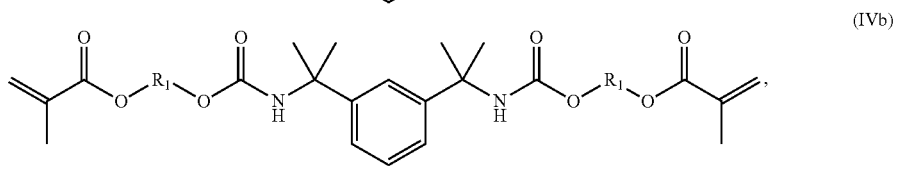

(IVb)

in which each $R_1$ is independently defined as above.

Very preferably, the compound of the general formula (I) is a compound of the formulas (IIc), (IId), (IIId), (IIIe), (IIIf), (IVc) or (IVd):

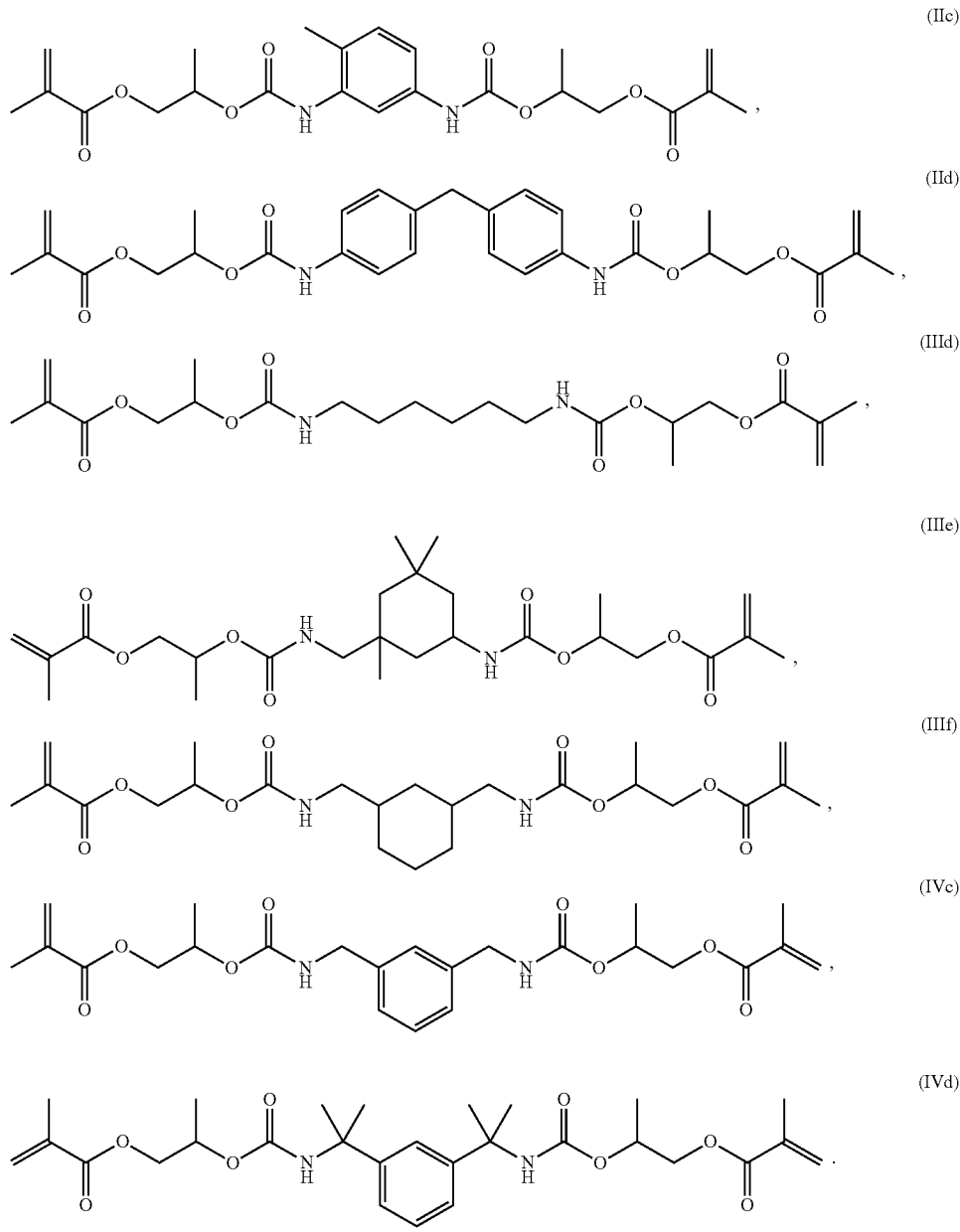

The structures shown in formulas (IIa) to (IId) and (IVa) to (IVd) are intended to represent the compounds according to the invention only by way of example, since the diisocyanates used for their production can be used both as isomerically pure compounds and as mixtures of different isomers, in each case having a different composition, i.e. in different proportions. The structures shown are therefore not to be interpreted as limiting.

Consequently, the compounds according to the invention may be present as isomerically pure compounds or as mixtures of isomers in different compositions, which can optionally be separated in a conventional manner. Both the pure isomers and the isomer mixtures are the subject of the present invention. Mixtures with different proportions of isomeric compounds are likewise the subject of the invention.

The compounds of formulas (IIIa) to (IIIf) may be present both as pure compounds and as optical isomers or mixtures of isomers in different compositions, which can optionally be separated in a conventional manner. Both the pure isomers and the isomer mixtures and the use thereof are the subject of the present invention. Mixtures with different proportions of isomeric compounds are likewise the subject of the invention.

The low-viscosity aliphatic urethane methacrylate compounds are used primarily to reduce the viscosity of a reactive resin containing these compounds and the dispensing forces of a reactive resin component containing these compounds. They therefore have a positive effect on the processability of the reactive resin components, in particular of a reactive resin system comprising said reactive resin components. Furthermore, the use thereof can reduce the proportion of reactive diluents.

The low-viscosity aromatic urethane methacrylate compounds also serve to positively influence, in particular increase, the load values of a cured reactive resin component containing these compounds.

Branched Aromatic Urethane Methacrylate Compounds

According to the invention, the mixture as a radically curable compound may be a branched urethane methacrylate compound of the general formula (V)

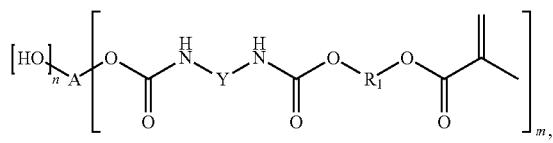

in which
Y is an aromatic hydrocarbon group,
A is a linear or branched aliphatic $C_3$-$C_{10}$ alkylene group,
each $R_1$ is independently a branched or linear aliphatic $C_1$-$C_{15}$ alkylene group,
n is a whole number greater than or equal to 0, and
m is a whole number greater than or equal to 3.

In a preferred embodiment, the branched urethane methacrylate compound is a compound of the general formula (VI)

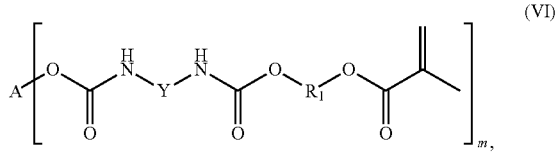

in which
Y is an aromatic hydrocarbon group,
A is a linear or branched aliphatic $C_3$-$C_{10}$ alkylene group,
each $R_1$ is independently a branched or linear aliphatic $C_1$-$C_{15}$ alkylene group, and
m is a whole number greater than or equal to 3.

The aromatic hydrocarbon group Y is divalent and preferably has 6 to 20 carbon atoms and more preferably 6 to 14 carbon atoms. The aromatic hydrocarbon group may be substituted, in particular by alkyl groups, of which alkyl groups having one to four carbon atoms are preferred.

In one embodiment, the aromatic hydrocarbon group Y contains a benzene ring which may be substituted.

In an alternative embodiment, the aromatic hydrocarbon group Y contains two fused benzene rings or two benzene rings bridged by an alkylene group such as a methylene or ethylene group. Both the benzene rings and the alkylene bridge may be substituted, preferably with alkyl groups.

The aromatic hydrocarbon group is derived from aromatic diisocyanates, "aromatic diisocyanate" meaning that the two isocyanate groups are bonded directly to an aromatic hydrocarbon skeleton.

Suitable aromatic hydrocarbon groups are divalent groups as obtained by removing the isocyanate groups from an aromatic diisocyanate, for example a divalent phenylene group from a benzene diisocyanate, a methylphenylene group from a toluene diisocyanate (TDI) or an ethylphenylene group from an ethylbenzene diisocyanate, a divalent methylene diphenylene group from a methylene diphenyl diisocyanate (MDI) or a divalent naphthyl group from a naphthalene diisocyanate (NDI).

Particularly preferably, Y is derived from 1,3-diisocyanatobenzene, 1,4-diisocyanatobenzene, 2,4-diisocyanatotoluene, 2,6-diisocyanatotoluene, 2,4'-diphenylmethane diisocyanate, 4,4'-diphenylmethane diisocyanate or 1,5-diisocyanatonaphthalene.

That which is already stated above for the formula (I) applies with regard to the group $R_1$, so that at this point reference is made to the definition above which is to be applied correspondingly to the formulas (V) and (VI).

The aliphatic $C_3$-$C_{10}$ alkylene group A serves as a skeleton to which the urethane methacrylate groups are attached, and is a trivalent or higher-valency $C_3$-$C_{10}$ alkylene group which is linear or branched.

Suitable linear or branched aliphatic $C_3$-$C_{10}$ alkylene groups are trivalent or higher-valency, preferably tri- or tetravalent, groups as obtained by removing the hydroxyl groups from a trifunctional or higher-function, preferably tri- or tetrafunctional, alcohol. Correspondingly suitable alcohols are, for example, glycerol, trimethylolmethane, trimethylolethane, trimethylolpropane, trimethylolbutane, 1,2,4-butanetriol, 1,2,3-hexanetriol, 1,2,4-hexanetriol, pentaerythritol, diglycerol, triglycerol, bis(trimethylolpropane), sugars, such as glucose, sugar derivatives, such as sorbitol, mannitol, diglycerol, threitol, erythritol, adonite (ribitol), arabitol (lyxite), xylitol, dulcitol (galactitol), maltitol, isomalt, or poyesterol.

This ensures that more than two radically curable groups, specifically the methacrylate groups, are contained per compound, so that the compounds serve as crosslinkers in the polymerization. The use of these compounds can lead to crosslinking of the formed polymer chains due to the further methacrylate group, so that a crosslinked polymer network can be formed.

Accordingly, m together with n (m+n) corresponds to the valency of the alcohol used to produce the compound according to the invention. Consequently, m=3 if a trifunctional alcohol is used and m+n=3 or 4 if a tetrafunctional alcohol is used.

By controlling the reaction conditions, it is possible that not all of the hydroxyl groups react with an isocyanate group, so that free hydroxyl groups are still present in the obtained compound. These compounds are also included within the scope of the invention.

This results in compounds of general formula (I) in which n>0.

If all the hydroxyl groups are reacted so that no free hydroxyl groups are present in the resulting compound, m alone (n=0) corresponds to the valency of the alcohol used to produce the compound according to the invention. Consequently, m=3 if a trifunctional alcohol is used and m=4 if a tetrafunctional alcohol is used.

This results in compounds of general formula (I) in which n=0, as shown in formula (II).

Preferably n=0, 1 or 2 and m=3, 4 or 5, more preferably n=0 or 1 and m=3 or 4 and particularly preferably n=0 and m=3 or 4.

Preferably, n+m=3, 4, 5 or 6, more preferably 3, 4 or 5, and very preferably n+m=3 or 4, with the proviso that m≥3.

Preferably n=0, 1 or 2 and m=2, 3 or 4 where n+m=3, 4, 5 or 6, more preferably n=0 or 1 and m=2, 3 or 4 where n+m=3, 4 or 5 and particularly preferably n=0 and m=3 or 4 (n+m=3 or 4), in each case with the proviso that m≥3.

The branched urethane methacrylate compounds are obtained by reacting a hydroxyalkyl methacrylate with an aromatic diisocyanate and an at least trifunctional alcohol. The hydroxyalkyl methacrylate, the aromatic diisocyanate and the alcohol are reacted in the presence of a catalyst and an inhibitor which serves to stabilize the formed compound.

Suitable hydroxyalkyl methacrylates and aromatic diisocyanates are those as mentioned above in connection with the compounds of formula (I). For this reason, reference is made to the statements made there which apply correspondingly to the compounds of formulas (V) and (VI).

Suitable alcohols are trifunctional or higher-function alcohols selected from $C_3$-$C_{10}$ alcohols, preferably $C_3$-$C_4$ alcohols with the hydroxyl groups at the ends and/or along the alkyl chain. Examples of alcohols having at least three OH groups include glycerol, trimethylolmethane, trimethylolethane, trimethylolpropane, trimethylolbutane, 1,2,4-butanetriol, 1,2,3-hexanetrol, 1,2,4-hexanetrol, pentaerythritol, diglycerol, triglycerol, bis(trmethylolpropane), sugars, such as glucose, sugar derivatives, such as sorbitol, mannitol, diglycerol, threitol, erythritol, adonite (ribitol), arabitol (lyxite), xylitol, dulcitol (galactitol), maltitol, isomalt, or polyesterol, of which glycerol, trimethylpropane and pentaerythritol are preferred.

The compounds according to the invention of formulas (V) and (VI) are preferably compounds of the general formula (Va), (Vb), (Va) or (Vb):

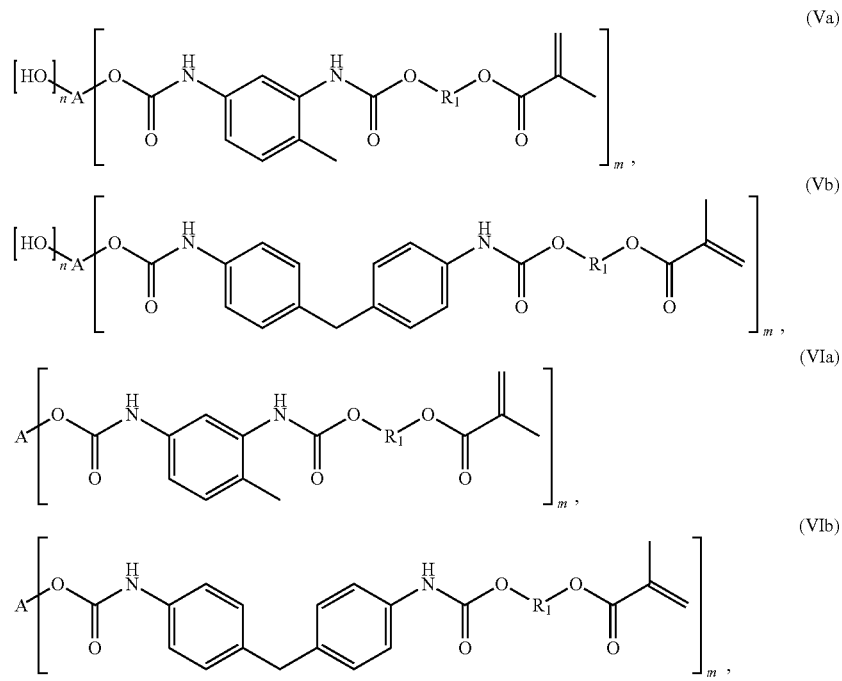

in which A, $R_1$, n and m are each as defined above for formulas (V) and (VI).

Particularly preferred compounds according to the invention are compounds of formulas (VIc) and (VId):

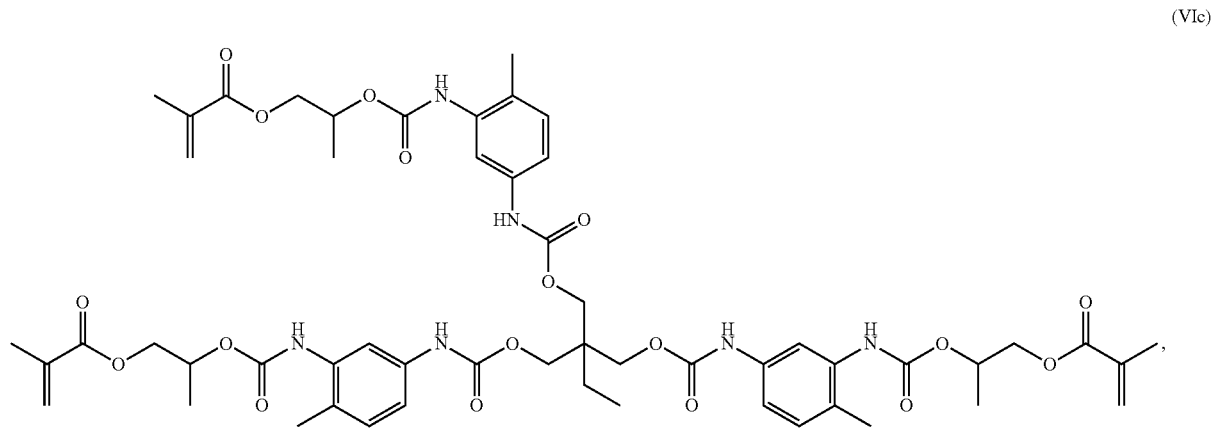

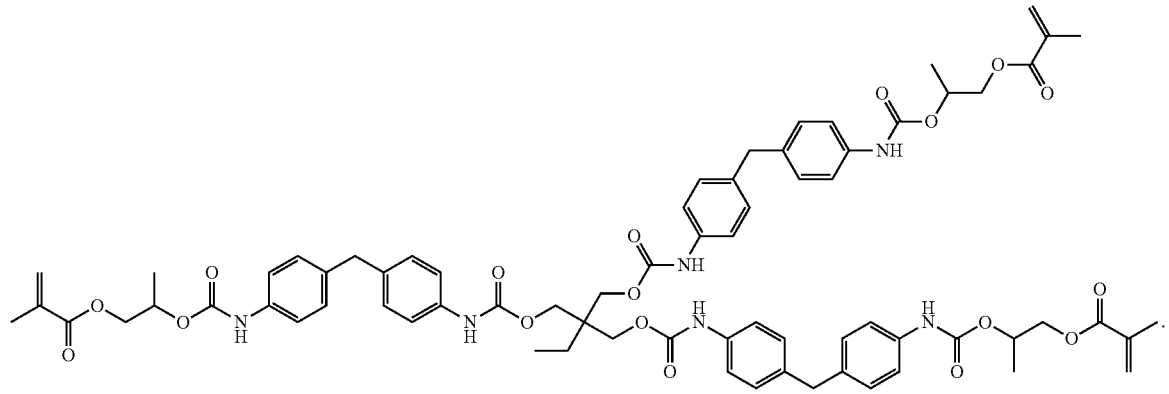

The structures shown in formulas (Va), (Vb) and (VIa) to (VId) are intended to represent the compounds according to the invention only by way of example, since the aromatic diisocyanates used for their production can be used both as isomerically pure compounds and as mixtures of different isomers, in each case having a different composition, i.e. in different proportions. The structures shown are therefore not to be interpreted as limiting.

Consequently, the compounds according to the invention may be present as isomerically pure compounds or as mixtures of isomers in different compositions, which can optionally be separated in a conventional manner. Both the pure isomers and the isomer mixtures are the subject of the present invention. Mixtures with different proportions of isomeric compounds are likewise the subject of the invention.

Furthermore, depending on the reaction control, in particular owing to the ratio of isocyanate groups from the diisocyanate to hydroxyl groups from the trifunctional or higher-function alcohol, the oligomers of the compounds of formulas (V) and (VI) can be formed such that the compounds have an oligomer distribution. The oligomer is shown in each case with a repeating unit. However, the representation with a repetition unit is not to be interpreted as limiting, but serves to produce a simpler representation. The oligomers not shown are also encompassed by the invention, if present.

The branched aromatic urethane methacrylate compounds primarily serve to positively influence, in particular increase, the load values of the cured reactive resin components. The additional methacrylate group compared with the compounds of formula (I) provides a branching point so that a higher degree of branching can be achieved. This creates the possibility of higher crosslinking. It is expected that a more highly branched polymer network will form. This is particularly advantageous if tri- or multi-functional reactive diluents are dispensed with but the possibility of higher crosslinking is to be maintained.

Low-Viscosity Epoxy Methacrylate Compounds

According to the invention, the mixture as a radically curable compound can be a low-viscosity branched epoxy methacrylate compound of general formula (VII)

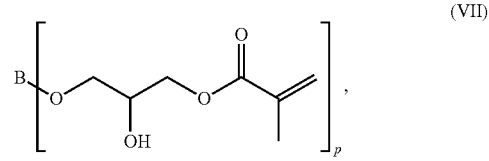

in which
B is a linear, branched or cyclic aliphatic hydrocarbon group or an aromatic hydrocarbon group, and
p is a whole number greater than or equal to 2.

(i) Divalent Linear, Branched or Cyclic Aliphatic Hydrocarbon Group B

The hydrocarbon group B may be a divalent linear, branched or cyclic aliphatic hydrocarbon group which may be substituted, in particular hydroxy-substituted.

Preferably, the aliphatic hydrocarbon group is a linear or branched alkylene group which is optionally hydroxy-substituted.

The alkylene group is preferably a $C_2$-$C_{12}$ alkylene group, more preferably a $C_2$-$C_6$ alkylene group, even more preferably a $C_2$-$C_6$ alkylene group. The alkylene group may be substituted, in particular by an alkyl functional group.

Suitable alkylene groups are n-valent groups as obtained by removing the glycidyl groups from an aliphatic polyglycidyl compound, where n is the number of glycidyl groups (valency) in the polyglycidyl compound. In this case, m corresponds to the number of glycidyl groups in the polyglycidyl compound and thus the valency of the polyglycidyl compound. The polyglycidyl compounds are derived from polyhydric alcohols in which the hydroxyl groups are completely or partially converted into a glycidyl ether group by reaction with epihalohydrin. Suitable polyalcohols are, for example, 1,2-ethanediol, 1,2-propanediol, 1,3-propanediol, 1,3-butanediol, 1,4-butanediol, 1,6-hexanediol, glycerol, neopentyl glycol, ethylene glycol, cyclohexanedimethanol, trimethylolpropane, pentaerythritol and polyethylene glycols.

(ii) Divalent Aromatic Hydrocarbon Group B

The hydrocarbon group B may be a divalent aromatic hydrocarbon group, preferably a $C_6$-$C_{20}$ hydrocarbon group and more preferably a $C_6$-$C_{14}$ hydrocarbon group, particularly preferably a $C_{13}$-$C_{15}$ hydrocarbon group. The aromatic hydrocarbon group may be substituted, in particular by alkyl groups, of which alkyl groups having one to four carbon atoms are preferred.

In one embodiment, the aromatic hydrocarbon group contains a benzene ring which may be substituted.

In an alternative embodiment, the aromatic hydrocarbon group contains two fused benzene rings or two benzene rings bridged by an alkylene group such as a methylene or ethylene group. Both the benzene rings and the alkylene bridge may be substituted, preferably with alkyl groups.

The aromatic hydrocarbon group B is derived from aromatic diglycidyl ethers, "aromatic diglycidyl ether" meaning that the two glycidyl ether groups are bonded directly to an aromatic hydrocarbon skeleton.

Suitable aromatic hydrocarbon groups are divalent groups as obtained by removing the glycidyl ether groups from an aromatic diglycidyl ether, for example a divalent phenylene group from a benzene diisocyanate, a methylphenylene group from a resorcinol diglycidyl ether or a divalent, optionally alkyl-substituted methane diphenylene group from a bisphenol diglycidyl ether.

Particularly preferably, the aromatic hydrocarbon group is derived from 1,3-bis(glycidyloxy)benzene, bisphenol A diglycidyl ether or bisphenol F diglycidyl ether.

p is preferably a whole number between 2 and 5, more preferably between 2 and 4, even more preferably 2 or 3.

When B is a divalent aromatic hydrocarbon group B, particularly preferably p=2.

If p is 2, the compound of formula 1 has two terminal methacrylate groups which can radically polymerize.

If p is greater than 2, the compound of formula 1 has more than two terminal methacrylate groups which can radically polymerize. Due to the additional methacrylate group, such as a third methacrylate group when p is 3, a branching point is provided so that a higher degree of branching can be achieved. This creates the possibility of higher crosslinking.

It is expected that a more highly branched polymer network will form. This is particularly advantageous if tri- or multi-functional reactive diluents are dispensed with but the possibility of higher crosslinking is to be maintained.

Preferred compounds according to the invention having two methacrylate groups have the structure (VIIIa), (VIIIb), (VIIIc), (VIIId) or (VIIIe):

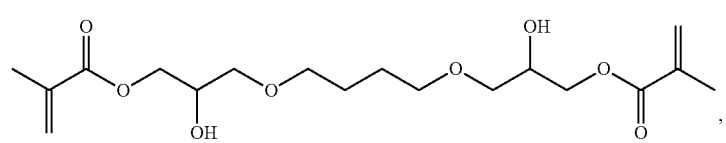
(VIIIa)

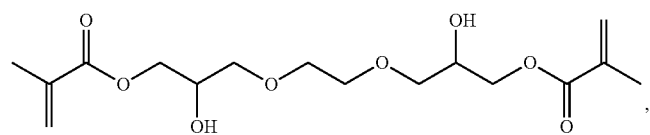
(VIIIb)

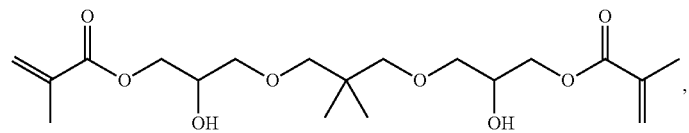
(VIIIc)

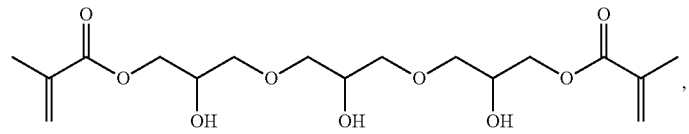
(VIIId)

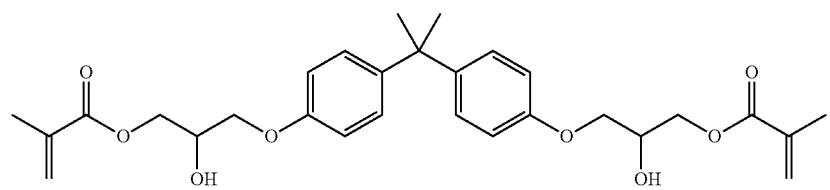
(VIIIe)

A preferred compound according to the invention having three methacrylate groups has the structure (IX):

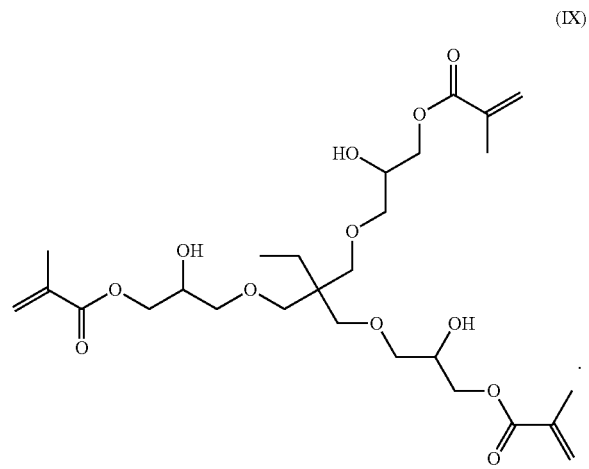 [SMILES: C=C(C)C(=O)OCC(O)COCC(CC)(COCC(O)COC(=O)C(=C)C)COCC(O)COC(=O)C(=C)C]

The low-viscosity epoxy methacrylate compounds can be obtained by reacting methacrylic acid with a multifunctional glycidyl ether. It is expedient to use 0.7 to 1.2 carboxyl equivalents of methacrylic acid per epoxide equivalent. The epoxide group-containing organic compounds and the methacrylic acid are preferably used in stoichiometric ratios for example, i.e. for example one equivalent of methacrylic acid is used per epoxide equivalent of the organic compound. The glycidyl ether and the methacrylic acid are reacted in the presence of a catalyst and optionally an inhibitor which serves to stabilize the formed backbone resin. This produces the backbone resin.

Suitable glycidyl ethers are aliphatic or alicyclic glycidyl ethers of polyols (polyhydric alcohols) having an epoxide functionality of at least 2, such as 1,4-butanediol diglycidyl ether (BDDGE), cyclohexanedimethanol diglycidyl ether, hexanediol diglycidyl ether and/or in particular tri- or higher glycidyl ethers, e.g. glycerol triglycidyl ether, pentaerythritol tetraglycidyl ether or trimethylolpropane triglycidyl ether (TMPTGE).

In addition, low-viscosity glycidyl ethers can be used, which can be used in epoxy-amine systems as reactive diluents and have an epoxy functionality of at least two.

The low-viscosity epoxy methacrylate compounds are used primarily to reduce the viscosity of a reactive resin containing these compounds and the dispensing forces of a reactive resin component containing these compounds. They therefore have a positive effect on the processability of the reactive resin components, in particular of a reactive resin system comprising said reactive resin components. Furthermore, the use thereof can reduce the proportion of reactive diluents.

When p in formula (VI) is 3 or more, a branching point is provided by the additional methacrylate group so that a higher degree of branching can be achieved. This creates the possibility of higher crosslinking. It is expected that a more highly branched polymer network will form. This is particularly advantageous if tri- or multi-functional reactive diluents are dispensed with but the possibility of higher crosslinking is to be maintained.

In the event that, when all the compounds described above are produced for the mixture according to the invention, not all isocyanate or glycidyl groups are reacted or part of the isocyanate or glycidyl groups are converted before the reaction, for example by a side reaction in other groups, compounds are obtained which may be contained either as main compounds or as impurities in the reaction resin master batches. These compounds, insofar as they can be used for the purposes according to the invention, are also encompassed by the invention.

Mixture According to the Invention

According to the invention, the mixture comprises at least two radically curable compounds as described above. In this case, any mixture is possible, i.e. the compounds can be freely selected from the above formulas (I), (V) and (VII).

The radically curable compounds can be selected exclusively from compounds of general formula (I). In this case, the compounds may be exclusively aromatic in nature, which in the context of the invention means that the compounds are selected from compounds of general formula (I) in which X is a divalent aromatic or a divalent aromatic-aliphatic hydrocarbon group. Correspondingly, it is possible that the compounds are exclusively aliphatic in nature, which in the context of the invention means that the compounds are selected from compounds of general formula (I), in which X is a divalent linear, branched or cyclic aliphatic hydrocarbon group. Furthermore, it is possible that the compounds are mixed in nature, one compound being aromatic in nature and one compound being aliphatic in nature.

In an alternative, the radically curable compounds can also be exclusively branched aromatic urethane methacrylate compounds and can be selected from compounds of general formula M. In this case, a higher proportion of reactive diluents may be necessary since these compounds already have a relatively high viscosity compared to the other compounds described herein.

In another alternative, the radically curable compounds can also be exclusively low-viscosity epoxy methacrylate compounds and can be selected from compounds of general formula (VII). In this case, the compounds may be exclusively linear in nature, which in the context of the invention means that the compounds are selected from compounds of general formula (VII), in which p is two, so that the compounds bear two methacrylate groups. Correspondingly, it is possible that the compounds are exclusively linear in nature, which in the context of the invention means that the compounds are selected from compounds of general formula (VII), in which p is greater than two, so that the compounds therefore bear three or more methacrylate groups. Furthermore, it is possible that the compounds are mixed in nature, one compound being linear in nature and one compound being branched in nature. Furthermore, the compounds may be exclusively aromatic in nature, which in the context of the invention means that the compounds are selected from compounds of general formula (VII) in which B is a divalent aromatic hydrocarbon group. Correspondingly, it is possible that the compounds are exclusively aliphatic in nature, which in the context of the invention means that the compounds are selected from compounds of general formula (VII), in which B is a divalent linear, branched or cyclic aliphatic hydrocarbon group. Furthermore, it is possible that the compounds are mixed in nature, one compound being aromatic in nature and one compound being aliphatic in nature.

In addition, any combination of radically curable compounds from the above formulas (I), (V) and (VII) are possible as mixtures. For example, a compound is selected from compounds of the above formula (I) and the further compound is selected from compounds of the above formulas (V) or (VII). In another example, a compound is selected from compounds of the above formula (V) and the further compound is selected from compounds of the above formula (VII).

The mixture according to the invention may also contain more than two of the radically curable compounds described above, there being no restriction with regard to the combination of the compound in this case either. Therefore, that which is already stated for a mixture of two radically curable compounds applies correspondingly.

The selection of the compounds for the mixture is based on the desired properties of the reactive resin or the reactive resin component in which the mixture is to be used.

If reducing the viscosity of a reactive resin and thus reducing the dispensing forces of a reactive resin component in a reactive resin system is a priority, the compounds are preferably selected from low-viscosity compounds, or the proportion of low-viscosity compounds is kept as high as possible.

However, if increasing the load values of a cured composition based on a reactive resin component containing the mixture is a priority, the compounds are preferably selected from low-viscosity or branched aromatic urethane methacrylate compounds and/or from branched epoxy methacrylate compounds.

The invention also makes it possible to achieve both a reduction in the viscosity of a reactive resin and a reduction in the dispensing forces of a reactive resin component in a reactive resin system and an increase in the load values of a cured composition based on a reactive resin component containing the mixture.

In this regard, reference is made to the above-described characteristics associated with the various types of compounds; the descriptions are not to be interpreted as limiting but are intended to serve as a guide to the field of application thereof.

A person skilled in the art knows or can easily determine which compounds must be selected for a mixture and which mixing ratio must be selected in order to address the desired use and the desired property of a formulation in which the mixture is to be used.

A preferred mixture according to the invention comprises at least two compounds selected from the group consisting of compounds of formulas (IIa), (IIb), (IIIa), (IIIb), (IIIc), (IVa), (IVb), (VIa), (VIb) and (VII).

A further preferred mixture according to the invention comprises at least two compounds selected from the group consisting of compounds of formulas (IIc), (IId), (IIId), (IIIe), (IIIf), (IVc), (IVd), (VIc), (VId), (VIIIa), (VIIIb), (VIIIc), (VIIId), (VIIIe) and (IX).

Particularly referred mixtures according to the invention are the following mixtures:
  a mixture comprising compound (IIb) and (IIa)
  a mixture comprising compound (IIa) and (IIb)
  a mixture comprising compound (VIIIa) and (VIIIe)
  a mixture comprising compound (IIb) and (VIIIa)
  a mixture comprising compound (IIIa) and (VIIIe)
  a mixture of compound (IIb), (IIIa) and (VIIIe)
  a Mixture of Compound (IIb), (VIIIa) and (VIIIe).

Reactive Resins

The mixtures according to the invention are used for producing a reactive resin. This can reduce the viscosity of the reactive resin produced in this way without requiring a high proportion of reactive diluents, as is the case with the commercially available compositions, and without the problems associated with a high proportion of reactive diluents, such as the reduction of the achievable load values of the cured compositions. The dispensing forces of a reactive resin system containing the compounds according to the invention can therefore be reduced. Furthermore, the use of the mixture according to the invention can increase the load values of a cured fastening composition.

The reactive resin according to the invention contains a mixture of at least two radically curable compounds as described above as a mixture of backbone resins, an inhibitor, an accelerator and optionally a reactive diluent. Since the backbone resins are used for the production of the reactive resin typically without isolation after their production, the other constituents contained in the respective reactive resin master batches in addition to the backbone resins are also usually present in the reactive resin, such as a catalyst.

The proportion of the mixture, regardless of whether the mixture contains two or more radically curable compounds, in the reactive resin of the invention is from 25 wt. % to 65 wt. %, preferably from 30 wt. % to 45 wt. %, particularly preferably from 35 wt. % to 40 wt. %, very particularly preferably from 33 wt. % to 40 wt. %, based on the total weight of the reactive resin.

The stable radicals which are conventionally used for radically polymerizable compounds, such as N-oxyl radicals, are suitable as inhibitors, as are known to a person skilled in the art.

The inhibitor can serve to suppress unwanted radical polymerization during the synthesis of the backbone resin or the storage of the reactive resin and the reactive resin component. It may also serve—optionally additionally—to delay the radical polymerization of the backbone resin after addition of the initiator and thereby to adjust the processing time of the reactive resin or reactive resin component after mixing with the curing agent.

Examples of stable N-oxyl radicals which can be used are those described in DE 199 56 509 A1 and DE 195 31 649 A1. Stable nitroxyl radicals of this kind are of the piperidinyl-N-oxyl or tetrahydropyrrole-N-oxyl type or a mixture thereof.

Preferred stable nitroxyl radicals are selected from the group consisting of 1-oxy-2,2,6,6-tetramethylpiperidine, 1-oxyl-2,2,6,6-tetramethylpiperidin-4-ol (also referred to as TEMPOL), 1-oxyl-2,2,6,6-tetramethylpiperidin-4-one (also referred to as TEMPON), 1-oxyl-2,2,6,6-tetramethyl-4-carboxyl-piperidine (also referred to as 4-carboxy-TEMPO), 1-oxyl-2,2,5,5-tetramethylpyrrolidine, 1-oxyl-2,2,5,5-tetramethyl-3-carboxylpyrrolidine (also referred to as 3-carboxy-PROXYL) and mixtures of two or more of these compounds, 1-oxyl-2,2,6,6-tetramethylpiperidin-4-ol (TEMPOL) being particularly preferred.

In addition to the nitroxyl radical of the piperidinyl-N-oxyl or tetrahydropyrrole-N-oxyl type, one or more further inhibitors may be present both to further stabilize the reactive resin or the reactive resin component (A) containing the reactive resin or other compositions containing the reactive resin and to adjust the resin reactivity.

For this purpose, the inhibitors which are conventionally used for radically polymerizable compounds are suitable, as are known to a person skilled in the art. These further inhibitors are preferably selected from phenolic compounds and non-phenolic compounds and/or phenothiazines.

Phenols, such as 2-methoxyphenol, 4-methoxyphenol, 2,6-di-tert-butyl-4-methylphenol, 2,4-di-tert-butylphenol, 2,6-di-tert-butylphenol. 2,4,6-trimethylphenol, 2,4,6-tris(dimethylaminomethyl)phenol, 4,4'-thio-bis(3-methyl-6-tert-butylphenol), 4,4'-isopropylidenediphenol, 6,6'-di-tert-butyl-4,4'-bis(2,6-di-tert-butylphenol), 1,3,5-trimethyl-2,4,6-tris(3,5-di-tert-butyl-4-hydroxybenzyl)benzene, 2,2'- methylene-di-p-cresol, catechols such as pyrocatechol, and catechol derivatives such as butyl catechols such as 4-tert-butylpyrocatechol and 4,6-di-tert-butylpyrocatechol, hydroquinones such as hydroquinone, 2-methylhydroquinone, 2-tert-butylhydroquinone, 2,5-di-tert-butylhydroquinone, 2,6-di-tert-butylhydroquinone, 2,6-dimethylhydroquinone, 2,3,5-trimethylhydroquinone, benzoquinone, 2,3,5,6-tetrachloro-1,4-benzoquinone, methylbenzoquinone, 2,6-dimethylbenzoquinone, naphthoquinone, or mixtures of two or more thereof, are suitable as phenolic inhibitors. These inhibitors are often a constituent of commercial radically curing reactive resin components.

Phenothiazines such as phenothiazine and/or derivatives or combinations thereof, or stable organic radicals such as galvinoxyl and N-oxyl radicals, but not of the piperidinyl-N-oxyl or tetrahydropyrrole-N-oxyl type, are preferably considered as non-phenolic inhibitors, such as aluminum-N-nitrosophenylhydroxylamine, diethylhydroxylamine, oximes such as acetaldoxime, acetone oxime, methyl ethyl ketoxime, salicyloxime, benzoxime, glyoximes, dimethylglyoxime, acetone-O-(benzyloxycarbonyl)oxime, and the like.

Furthermore, pyrimidinol or pyridinol compounds substituted in para-position to the hydroxyl group, as described in the patent DE 10 2011 077 248 B1, can be used as inhibitors.

The further inhibitors are preferably selected from the group of catechols, catechol derivatives, phenothiazines, tert-butylcatechol, tempol, or a mixture of two or more thereof. Particularly preferably, the other inhibitors are selected from the group of catechols and phenothiazines. The further inhibitors used in the examples are very particularly preferred, preferably approximately in the amounts indicated in the examples.

The other inhibitors may be used either alone or as a combination of two or more thereof, depending on the desired properties of the reactive resin.

The inhibitor or inhibitor mixture is added in conventional amounts known in the art, preferably in an amount of approximately 0.0005 to approximately 2 wt. % (based on the reactive resin, which is ultimately produced therewith), more preferably from approximately 0.01 to approximately 1 wt. % (based on the reactive resin), even more preferably from approximately 0.05 to approximately 1 wt. % (based on the reactive resin), yet more preferably from approximately 0.2 to approximately 0.5 wt. % (based on the reactive resin).

The radically curable compounds described herein, particularly when used in reactive resins and reactive resin components for chemical fastening and structural bonding, are generally cured by peroxides as a curing agent. The peroxides are preferably initiated by an accelerator, so that polymerization takes place even at low application temperatures. The accelerator is already added to the reactive resin.

Suitable accelerators which are known to a person skilled in the art are, for example, amines, preferably tertiary amines and/or metal salts.

Suitable amines are selected from the following compounds: dimethylamine, trimethylamine, ethylamine, diethylamine, triethylamine, n-propylamine, di-n-propylamine, tri-n-propylamine, isopropylamine, diisopropylamine, triisopropylamine, n-butylamine, isobutylamine, tert-butylamine, di-n-butylamine, diisobutylamine, triisobutylamine, pentylamine, isopentylamine, diisopentylamine, hexylamine, octylamine, dodecylamine, laurylamine, stearylamine, aminoethanol, diethanolamine, triethanolamine, aminohexanol, ethoxyaminoethane, dimethyl-(2-chloroethyl)amine, 2-ethylhexylamine, bis-(2-chloroethyl)amine, 2-ethylhexylamine, bis-(2-ethylhexyl)amine, N-methylstearylamine, dialkylamines, ethylenediamine, N,N'-dimethylethylenediamine, tetramethylethylenediamine, diethylenetriamine, permethyldiethylenetriamine, triethylenetetramine, tetraethylenepentamine, 1,2-diaminopropane, di-propylenetriamine, tripropylenetetramine, 1,4-diaminobutane, 1,6-diaminohexane, 4-amino-1-diethylaminopentane, 2,5-diamino-2,5-dimethylhexane, trimethylhexamethylenediamine, N,N-dimethylaminoethanol, 2-(2-diethylaminoethoxy)ethanol, bis-(2-hydroxyethyl)oleylamine, tris[2-(2-hydroxyethoxy)ethyl]amine, 3-amino-1-propanol, methyl-(3-aminopropyl) ether, ethyl-(3-aminopropyl)ether, 1,4-butanediol-bis(3-aminopropyl) ether, 3 dimethylamino-1-propanol, 1-amino-2-propanol, 1-diethylamino-2-propanol, diisopropanolamine, methyl-bis-(2-hydroxypropyl)amine, tris-(2-hydroxypropyl)amine, 4-amino-2-butanol, 2-amino-2-methylpropanol, 2-amino-2-methylpropanediol, 2-amino-2-hydroxymethylpropanediol, 5-diethylamino-2-pentanone, 3 methylaminopropionitrile, 6-aminohexanoic acid, 11-aminoundecanoic acid, 6-aminohexanoic acid ethyl ester, 11-aminohexanoate-isopropyl ester, cyclohexylamine, N-methylcyclohexylamine, N,N-dimethylcyclohexylamine, dicyclohexylamine, N-ethylcyclohexylamine, N-(2-hydroxyethyl)-cyclohexylamine, N,N-bis-(2-hydroxyethyl)-cyclohexylamine, N-(3-aminopropyl)-cyclohexylamine, aminomethylcyclohexane, hexahydrotoluidine, hexahydrobenzylamine, aniline, N-methylaniline, N,N-dimethylaniline, N,N-diethylaniline, N,N-di-propylaniline, iso-butylaniline, toluidine, diphenylamine, hydroxyethylaniline, bis-(hydroxyethyl)aniline, chloroaniline, aminophenols, aminobenzoic acids and esters thereof, benzylamine, dibenzylamine, tribenzylamine, methyldibenzylamine, α-phenylethylamine, xylidine, diisopropylaniline, dodecylaniline, aminonaphthalin, N-methylaminonaphthalin, N,N-dimethylaminonaphthalin, N,N-dibenzylnaphthalin, diaminocyclohexane, 4,4'-diamino-dicyclohexylmethane, diamino-dimethyl-dicyclohexylmethane, phenylenediamine, xylylenediamine, diaminobiphenyl, naphthalenediamines, toluidines, benzidines, 2,2-bis-(aminophenyl)-propane, aminoanisoles, amino-thiophenols, aminodiphenyl ethers, aminocresols, morpholine, N-methylmorpholine, N-phenylmorpholine, hydroxyethylmorpholine, N-methylpyrrolidine, pyrrolidine, piperidine, hydroxyethylpiperidine, pyrroles, pyridines, quinolines, indoles, indolenines, carbazoles, pyrazoles, imidazoles, thiazoles, pyrimidines, quinoxalines, aminomorpholine, dimorpholineethane, [2,2,2]-diazabicyclooctane and N,N-dimethyl-p-toluidine.

The accelerator used according to the invention is di-isopropanol-p-toluidine or N,N-bis(2-hydroxyethyl)-m-toluidine.

Preferred amines are aniline derivatives and N,N-bisalkylarylamines, such as N,N-dimethylaniline, N,N-diethylaniline, N,N-dimethyl-p-toluidine, N,N-bis(hydroxyalkyl)arylamines, N,N-bis(2-hydroxyethyl)aniline, N,N-bis(2-hydroxyethyl)toluidine, N,N-bis(2-hydroxypropyl)aniline, N,N-bis(2-hydroxypropyl)toluidine, N,N-bis(3-methacryloyl-2-hydroxypropyl)-p-toluidine, N,N-dibutoxyhydroxypropyl-p-toluidine and 4,4'-bis(dimethylamino)diphenylmethane. Di-iso-propanol-p-toluidine is particularly preferred.

Polymeric amines, such as those obtained by polycondensation of N,N-bis(hydroxyalkyl)aniline with dicarboxylic acids or by polyaddition of ethylene oxide or other epoxides and these amines, are also suitable as accelerators.

Suitable metal salts are, for example, cobalt octoate or cobalt naphthenoate as well as vanadium, potassium, calcium, copper, manganese or zirconium carboxylates. Other suitable metal salts are the tin catalysts described above.

If an accelerator is used, it is used in an amount of from 0.01 to 10 wt. %, preferably from 0.2 to 5 wt. %, based on the reactive resin.

The reactive resin may still contain a reactive diluent, if necessary.

In this case, an excess of hydroxy-functionalized (meth)acrylate used optionally in the production of the urethane methacrylate compounds can function as a reactive diluent. In addition, if the hydroxy-functionalized (meth)acrylate is used in approximately equimolar amounts with the isocyanate group, or in addition if an excess of hydroxy-functionalized (meth)acrylate is used, further reactive diluents may be added to the reaction mixture which are structurally different from the hydroxy-functionalized (meth)acrylate.

Suitable reactive diluents are low-viscosity, radically co-polymerizable compounds, preferably labeling-free compounds, which are added in order to, inter alia, adjust the viscosity of the urethane methacrylate or precursors during its preparation, if required.

Suitable reactive diluents are described in the applications EP 1935 860 A1 and DE 195 31 649 A1. Preferably, the reactive resin (the resin mixture) contains, as the reactive diluent, a (meth)acrylic acid ester, particularly preferably aliphatic or aromatic $C_5$-$C_{15}$ (meth)acrylates being selected. Suitable examples include: 2-hydroxypropyl(meth)acrylate, 3-hydroxypropyl(meth)acrylate, 1,2-ethanediol di(meth)acrylate, 1,3-propanediol dimethacrylate, 1,3-butanediol di(meth)acrylate, 1,4-butanediol di(meth)acrylate, trimethylolpropane tri(meth)acrylate, phenylethyl (meth)acrylate, tetrahydrofurfuryl (meth)acrylate, ethyltriglycol (meth)acrylate, N,N-dimethylaminoethyl (meth)acrylate, N,N-dimethylaminomethyl (meth)acrylate, N,N-diethylaminoethyl (meth)acrylate, acetoacetoxyethyl (meth)acrylate, isobornyl (meth)acrylate, 2-ethylhexyl (meth)acrylate, tert-butylcyclohexyl(meth)acrylate, benzyl(meth)acrylate, methyl (meth)acrylate, n-butyl(meth)acrylate, isobutyl(meth)acrylate, 3-trimethoxysilylpropyl(meth)acrylate, isodecyl(meth)acrylate, diethylene glycol di(meth)acrylate, triethylene glycol di(meth)acrylate, methoxypolyethylene glycol mono (meth)acrylate, trimethylcyclohexyl (meth)acrylate, 2-hydroxyethyl (meth)acrylate, dicyclopentenyloxyethyl (meth)acrylate and/or tricyclopentadienyl di(meth)acrylate, bisphenol-A-(meth)acrylate, novolac epoxy di(meth)acrylate, di-[(meth)acryloyl-maleoyl]-tricyclo-5.2.1.0.2.6-decane, 3-(meth)acryloyl-oxymethyl-tricylo-5.2.1.0.2.6-decane, 3-(meth)cyclopentadienyl (meth)acrylate, and decalyl-2-(meth)acrylate; PEG-di(meth)acrylate such as PEG200 di(meth)acrylate, tetraethylene glycol di(meth)acrylate, solketal (meth)acrylate, cyclohexyl (meth)acrylate, phenoxyethyl di(meth)acrylate, 2-phenoxyethyl (meth)acrylate, hexanediol 1,6-di(meth)acrylate, 1,2-butanediol di(meth)acrylate, methoxyethyl (meth)acrylate, butyl diglycol (meth)acrylate, tert-butyl (meth)acrylate and norbornyl (meth)acrylate. Methacrylates are preferred over acrylates.

2- and 3-hydroxypropyl methacrylate, 1,2-ethanediol dimethacrylate, 1,4-butanediol dimethacrylate, 1,3-butanediol dimethacrylate, glycerol dimethacrylate, trimethylolpropane trimethacrylate, acetoacetoxyethyl methacrylate, isobornyl methacrylate, bisphenol A dimethacrylate, ethoxylated bisphenol A methacrylates such as E2BADMA or E3BADMA, trimethylcyclohexyl methacrylate, 2-hydroxyethyl methacrylate, PEG200 dimethacrylate and norbornyl methacrylate are particularly preferred; a mixture of 2- and 3-hydroxypropyl methacrylate and 1,4-butanediol dimethacrylate, or a mixture of these three methacrylates, is very particularly preferred.

A mixture of 2- and 3-hydroxypropyl methacrylate is most preferred. In principle, other conventional radically polymerizable compounds, alone or in a mixture with the (meth)acrylic acid esters, can also be used as reactive diluents, e.g. methacrylic acid, styrene, α-methylstyrene, alkylated styrenes, such as tert-butylstyrene, divinylbenzene and vinyl and allyl compounds, of which the representatives that are not subject to labeling are preferred. Examples of such vinyl or ally compounds are hydroxybutyl vinyl ether, ethylene glycol divinyl ether, 1,4-butanediol divinyl ether, trimethylolpropane divinyl ether, trimethylolpropane trivinyl ether, mono-, di-, tri-, tetra- and polyalkylene glycol vinyl ether, mono-, di-, tri-, tetra- and polyalkylene glycol allyl ether, divinyl adipate, trimethylolpropane diallyl ether and trimethylolpropane triallyl ether.

The reactive diluent(s) is/are added in an amount up to 65 wt. %, preferably up to 60 wt. %, more preferably up to 55 wt. %, particularly preferably in amounts below 50 wt. %, based on the reactive resin.

An example of a reactive resin comprises a mixture of a compound of the above formula (I) and a compound of the above formulas (V) or (VII) and at least one inhibitor, at least one accelerator and at least one reactive diluent.

In another example, a reactive resin comprises a mixture of a compound of the above formula (V) and a compound of the above formula (VII) and at least one inhibitor, at least one accelerator and at least one reactive diluent.

In another example, a reactive resin comprises a mixture comprising at least two compounds selected from the group consisting of compounds of formulas (IIa), (IIb), (IIIa), (IIIb), (IIIc), (IVa), (IVb), (VIa), (Vb) and (VII), and a stable nitroxyl radical as an inhibitor, a substituted toluidine as an accelerator and two reactive diluents.

In another example, a reactive resin comprises a mixture comprising at least two compounds selected from the group consisting of compounds of formulas (IIc), (IId), (IIId), (IIIe), (IIIf), (IVc), (IVd), (VIc), (VId), (VIIIa), (VIIIb), (VIIIc), (VIIId), (VIIIe) and (IX), and a stable nitroxyl radical as an inhibitor, a substituted toluidine as an accelerator and two reactive diluents.

In another example, a reactive resin comprises a mixture of the compounds of formulas (IIb) and (IIIa), or (IIa) and (IIb), or (VIIIa) and (VIIIe), or (IIb) and (VIIIa), or (IIIa) and (VIIIe), or (IIb), (IIIa) and (VIIIe), or (IIb), (VIIIa) and (VIIIe) and 4-hydroxy-2,2,6,6-tetramethyl-piperidinyl-1-oxyl (TEMPOL) as the inhibitor, di-isopropanol-p-toluidine as the accelerator and a mixture of hydroxypropyl methacrylate (HPMA) and 1,4-butanediol dimethacrylate (BDDMA) as reactive diluents.

Reactive Resin Components

A reactive resin according to the invention has, due to the low-viscosity mixture of a radically curable compound, a particularly low dynamic viscosity, so that it becomes possible to produce a reactive resin component for a reactive resin system which, at application temperatures below 10° C., preferably at 0° C. exhibits substantially lower dispensing forces in comparison with the conventional systems, without the previously required high proportions of reactive diluents.

If the mixture according to the invention contains a branched radically curable compound as a backbone resin component, such a reactive resin is able to form a polymer network, so that it becomes possible to produce a reactive resin component for a reactive resin system which, after being cured, has enhanced performance, in particular has increased load values in comparison with the conventional systems, without the previously required proportions of crosslinking reactive diluents.

The invention therefore also relates to a reactive resin component containing the reactive resin. In addition to the reactive resin of the invention, the reactive resin component may contain inorganic aggregates, such as fillers and/or additives. It should be noted that some substances can be used both as a filler and, optionally in modified form, as an additive. For example, fumed silica is used preferably as a filler in its polar, non-after-treated form and preferably as an additive in its non-polar, after-treated form. In cases in which exactly the same substance can be used as a filler or additive, its total amount should not exceed the upper limit for fillers that is established herein.

In order to produce a reactive resin component for construction purposes, in particular chemical fastening, conventional fillers and/or additives can be added to the reactive resin according to the invention. These fillers are typically inorganic fillers and additives, as described below for example.

The proportion of the reactive resin in the reactive resin component is preferably from approximately 10 to approximately 70 wt. %, more preferably from approximately 30 to approximately 50 wt. %, based on the reactive resin component. Accordingly, the proportion of the fillers is preferably from approximately 90 to approximately 30 wt. %, more preferably from approximately 70 to approximately 50 wt. %, based on the reactive resin component.

The fillers used are conventional fillers, preferably mineral or mineral-like fillers, such as quartz, glass, sand, quartz sand, quartz powder, porcelain, corundum, ceramics, talc, silicic acid (e.g. fumed silica, in particular polar, non-after-treated fumed silica), silicates, aluminum oxides (e.g. alumina), clay, titanium dioxide, chalk, barite, feldspar, basalt, aluminum hydroxide, granite or sandstone, polymeric fillers such as thermosets, hydraulically curable fillers such as gypsum, quicklime or cement (e.g. aluminate cement (often referred to as alumina cement) or Portland cement), metals such as aluminum, carbon black, further wood, mineral or organic fibers, or the like, or mixtures of two or more thereof. The fillers may be present in any desired forms, for example as powder or flour, or as shaped bodies, for example in cylindrical, annular, spherical, platelet, rod, saddle or crystal form, or else in fibrous form (fibrillar fillers), and the corresponding base particles preferably have a maximum diameter of approximately 10 mm and a minimum diameter of approximately 1 nm. This means that the diameter is approximately 10 mm or any value less than approximately 10 mm, but more than approximately 1 nm. Preferably, the maximum diameter is a diameter of approximately 5 mm in diameter, more preferably approximately 3 mm, even more preferably approximately 0.7 mm. A maximum diameter of approximately 0.5 mm is very particularly preferred. The more preferred minimum diameter is approximately 10 nm, more preferably approximately 50 nm, most preferably approximately 100 nm. Diameter ranges resulting from combination of this maximum diameter and minimum diameter are particularly preferred. However, the globular, inert substances (spherical form) have a preferred and more pronounced reinforcing effect. Core-shell particles, preferably in spherical form, can also be used as fillers.

Preferred fillers are selected from the group consisting of cement, silica, quartz, quartz sand, quartz powder, and mixtures of two or more thereof. For the reactive resin component (A), fillers selected from the group consisting of cement, fumed silica, in particular untreated, polar fumed silica, quartz sand, quartz powder, and mixtures of two or more thereof are particularly preferred. For the reactive resin component (A), a mixture of cement (in particular aluminate cement (often also referred to as alumina cement) or Portland cement), fumed silica and quartz sand is very particularly preferred. For the hardener component (B), fumed silica is preferred as the sole filler or as one of a plurality of fillers; particularly preferably, one or more further fillers are present in addition to the fumed silica.

The additives used are conventional additives, i.e. thixotropic agents, such as optionally organically or inorganically after-treated fumed silica (if not already used as a filler), in particular non-polary after-treated fumed silica, bentonites, alkyl- and methylcelluloses, castor oil derivatives or the like, plasticizers, such as phthalic or sebacic acid esters, further stabilizers in addition to the stabilizers and inhibitors according to the invention, antistatic agents, thickeners, flexibilizers, rheology aids, wetting agents, coloring additives, such as dyes or in particular pigments, for example for different staining of the components for improved control of their mixing, or the like, or mixtures of two or more thereof. Non-reactive diluents (solvents) can also be present, preferably in an amount of up to 30 wt. %, based on the total amount of the reactive resin component, such as low-alkyl ketones, for example acetone, di-low-alkyl low-alkanoyl amides, such as dimethylacetamide, low-alkylbenzenes, such as xylenes or toluene, phthalic acid esters or paraffins, water or glycols. Furthermore, metal catchers in the form of surface-modified fumed silicas may be present in the reactive resin component. Preferably, at least one thixotropic agent is present as an additive, particularly preferably an organically or inorganically after-treated fumed silica, very particularly preferably a non-polary after-treated fumed silica.

In this regard, reference is made to the patent applications WO 02/079341 and WO 02/079293 as well as WO 2011/128061 A1.

The proportion of the additives in the reactive resin component may be up to approximately 5 wt. %, based on the reactive resin component.

The reactive resins produced according to the invention can be used in many fields in which unsaturated polyester resins, vinyl ester resins or vinyl ester urethane resins are otherwise conventionally used. They are usually used as a resin constituent in the reactive resin component of a reactive resin system, such as a multi-component system, typically a two-component system consisting of a reactive resin component (A) and a hardener component (B). This multi-component system may be in the form of a shell system, a cartridge system or a film pouch system. In the intended use of the system, the components are either ejected from the shells, cartridges or film pouches under the application of mechanical forces or by gas pressure, are mixed together, preferably by means of a static mixer through which the components are passed, and applied.

The present invention therefore also relates to a reactive resin system comprising a reactive resin component (A) and a hardener component (B) containing an initiator for the urethane methacrylate compound.

The initiator is usually a peroxide. Any of the peroxides known to a person skilled in the art that are used to cure unsaturated polyester resins and vinyl ester resins can be used. Such peroxides include organic and inorganic peroxides, either liquid or solid, it also being possible to use hydrogen peroxide. Examples of suitable peroxides are peroxycarbonates (of the formula —OC(O)O—), peroxyesters (of the formula —C(O)OO—), diacyl peroxides (of the formula —C(O)OOC(O)—), dialkyl peroxides (of the formula —OO—) and the like. These may be present as oligomers or polymers.

Preferably, the peroxides are selected from the group of organic peroxides. Suitable organic peroxides are: tertiary alkyl hydroperoxides such as tert-butyl hydroperoxide and other hydroperoxides such as cumene hydroperoxide, peroxyesters or peracids such as tert-butyl peresters, benzoyl peroxide, peracetates and perbenzoates, lauryl peroxide including (di)peroxyesters, perethers such as peroxy diethyl ether, perketones, such as methyl ethyl ketone peroxide. The organic peroxides used as hardeners are often tertiary peresters or tertiary hydroperoxides, i.e. peroxide compounds having tertiary carbon atoms which are bonded directly to an —OO-acyl or —OOH— group. However, mixtures of these peroxides with other peroxides can also be used according to the invention. The peroxides may also be mixed peroxides, i.e. peroxides which have two different peroxide-carrying units in one molecule. For curing, (di-benzoyl)peroxide (BPO) is preferably used.

The reactive resin system may be in the form of a two- or multi-component system in which the respective components are spatially separated from one another, so that a reaction (curing) of the components takes place only after they have been mixed.

A two-component reactive resin system preferably comprises the A component and the B component, separated in different containers in a reaction-inhibiting manner, for example a multi-chamber device, such as a mufti-chamber shell and/or cartridge, from which containers the two components are ejected by the application of mechanical dispensing forces or by the application of a gas pressure and are mixed. Another possibility is to produce the two-component reactive resin system as two-component capsules which are introduced into the borehole and are destroyed by placement of the fastening element in a rotational manner, while simultaneously mixing of the two components of the mortar composition. Preferably, in this case a shell system or an injection system is used in which the two components are ejected out of the separate containers and passed through a static mixer in which they are homogeneously mixed and then discharged through a nozzle preferably directly into the borehole.

In a preferred embodiment of the reactive resin system according to the invention, the reactive resin system is a two-component system and the reactive resin component (A) also contains, in addition to the backbone resin, a hydraulically setting or polycondensable inorganic compound, in particular cement, and the hardener component (B) also contains, in addition the initiator for the polymerization of the backbone resin, water. Such hybrid mortar systems are described in detail in DE 4231161 A1. In this case, component (A) preferably contains, as a hydraulically setting or polycondensable inorganic compound, cement, for example Portland cement or alumina cement, with transition metal oxide-free or transition metal-low cements being particularly preferred. Gypsum can also be used as a hydraulically setting inorganic compound as such or in a mixture with the cement. Component (A) may also comprise silicatic, polycondensable compounds, in particular soluble, dissolved and/or amorphous silica-containing substances such as, for example, polar, non-after-treated fumed silica, as the polycondensable inorganic compound.

The volume ratio of component A to component B in a two-component system is preferably 3:1; 5:1 or 7:1. A volume ratio of 3:1 or 5:1 is particularly preferred.

In a preferred embodiment, the reactive resin component (A) therefore contains:
- at least one mixture as defined above, preferably at least two compounds selected from compounds of formulas (IIa), (IIb), (IIIa), (IIIb), (IIc), (IVa), (IVb), (VIa), (VIb) and (VII);
- at least one inhibitor of the piperidinyl-N-oxyl or tetrahydropyrrole-N-oxyl type as defined above, preferably TEMPOL;
- at least one accelerator as defined above, preferably a toluidine derivative, particularly preferably di-iso-propanol-p-toluidine;
- at least one hydraulically setting or polycondensable inorganic compound, preferably cement; and
- at least one thixotropic agent, preferably fumed silica, and the hardener component (B) contains:
- at least one initiator for initiating the polymerization of the urethane (meth)acrylate, preferably benzoyl peroxide (BPO) or tert-butyl peroxybenzoate; and
- water.

In a more preferred embodiment, the reactive resin component (A) contains:
- at least one mixture as defined above, preferably at least two compounds selected from compounds of formulas (IIa), (IIb), (IIIa), (IIIb), (IIIc), (IVa), (IVb), (VIa), (VIb) and (VII);
- at least one inhibitor of the piperidinyl-N-oxyl or tetrahydropyrrole-N-oxyl type as defined above, preferably TEMPOL;
- at least one accelerator, preferably a toluidine derivative, particularly preferably di-iso-propanol-p-toluidine;
- at least one hydraulically setting or polycondensable inorganic compound, preferably cement; and
- at least one thixotropic agent, preferably fumed silica, and the hardener component (B) contains:
- at least one initiator for initiating the polymerization of the urethane (meth)acrylate, preferably benzoyl peroxide (BPO) or tert-butyl peroxybenzoate;
- at least one filler, preferably quartz sand or quartz powder and
- water.

In an even more preferred embodiment, the reactive resin component (A) contains:
- at least one mixture as defined above, preferably at least two compounds selected from compounds of formulas (IIa), (IIb), (IIIa), (IIIb), (IIc), (IVa), (IVb), (VIa), (VIb) and (VII);
- at least one inhibitor of the piperidinyl-N-oxyl or tetrahydropyrrole-N-oxyl type as defined above, preferably TEMPOL;
- at least one accelerator, preferably a toluidine derivative, particularly preferably di-iso-propanol-p-toluidine;
- at least one further inhibitor selected from the group consisting of catechols and phenothiazines;
- at least one hydraulically setting or polycondensable inorganic compound, preferably cement; and
- at least one thixotropic agent, preferably fumed silica, and the hardener component (B) contains:
- at least one initiator for initiating the polymerization of the urethane (meth)acrylate, preferably benzoyl peroxide (BPO) or tert-butyl peroxybenzoate;
- at least one filler, preferably quartz sand or quartz powder;
- at least one thixotropic agent, preferably fumed silica; and
- water.

In an even more preferred embodiment, the reactive resin component (A) contains:
- at least one mixture as defined above, preferably at least two compounds selected from compounds of the formulas (IIc), (IId), (IIId), (IIIe), (IIIf), (IVc), (IVd), (VIc), (VId), (VIIIa), (VIIIb), (VIIIc), (VIIId), (VIIIe) and (IX);
- at least one inhibitor of the piperidinyl-N-oxyl or tetrahydropyrrole-N-oxyl type as defined above, preferably TEMPOL;
- at least one accelerator, preferably a toluidine derivative, particularly preferably di-iso-propanol-p-toluidine;
- at least one further inhibitor selected from the group consisting of catechols and phenothiazines;
- at least one hydraulically setting or polycondensable inorganic compound, preferably cement;
- at least one thixotropic agent, preferably fumed silica, and
- at least one further filler, preferably quartz sand, and the hardener component (B) contains:
- benzoyl peroxide (BPO) or tert-butyl peroxybenzoate as an initiator for initiating the polymerization of the urethane (meth)acrylate;
- at least one filler, preferably quartz sand or quartz powder;
- at least one thixotropic agent, preferably fumed silica; and
- water.

In an even more preferred embodiment, the reactive resin component (A) contains:
- at least one mixture as defined above, preferably the compounds of formulas (IIb) and (IIIa), or (IIa) and (IIb), or (VIIIa) and (VIIIe), or (IIb) and (VIIIa), or (IIIa) and (VIIIe), or (IIb), (IIIa) and (VIIIe) or (IIb), (VIIIa) and (VIIIe);
- TEMPOL;
- di-iso-propanol-p-toluidine;
- at least one further inhibitor selected from the group consisting of catechols and phenothiazines;
- cement;
- fumed silica; and
- quartz sand, and the hardener component (B) contains:
- at least one initiator for initiating the polymerization of the urethane (meth)acrylate;
- fumed silica;
- quartz sand or quartz powder and
- water.

In each of these embodiments, in a preferred embodiment the reactive resin component (A) additionally contains at least one reactive diluent.

The reactive resin components (A) and the hardener components (B) in each of these embodiments can be combined with one another as desired.

Such a reactive resin system is used especially in the field of construction (construction purposes), for example for the construction and maintenance or repair of components and structures, e.g. made of concrete, as polymer concrete, as a resin-based coating composition or as a cold-curing road marking, for reinforcing components and structures, such as walls, ceilings or floors, for fastening components, such as slabs or blocks, e.g. made of stone, glass or plastics material, on components or structures, for example by bonding (structural bonding). It is particularly suitable for chemical fastening. It is particularly suitable for (non-positive and/or positive) chemical fastening of anchoring means, such as anchor rods, bolts, rebar, screws or the like, in recesses, such as boreholes, in particular in boreholes in various substrates, in particular mineral substrates, such as those based on concrete, aerated concrete, brickwork, sand-lime brick, sandstone, natural stone, glass and the like, and metal substrates such as steel. In one embodiment, the substrate of the borehole is concrete, and the anchoring means is made of steel or iron. In another embodiment, the substrate of the borehole is steel, and the anchoring means is made of steel or iron. For this purpose, the components are injected into the borehole, after which the devices to be fixed, such as anchor threaded rods and the like, are introduced into the borehole provided with the curing reactive resin and are adjusted accordingly.

The following examples serve to explain the invention in greater detail.

EXAMPLES

In order to determine the influence of mixtures of radically curable compounds as a backbone resin on the viscosity of reactive resins and reactive resin components produced using these mixtures and the influence on the performance of fastening compositions containing these mixtures, mixtures of two or three reactive resins with different structural elements (aromatic, aliphatic) and/or different types of bonds (urethane methacrylate, glycidyl methacrylate) are produced in order to obtain the mixture of radically curable compounds. Reactive resins were obtained by mixing the reactive resins, which then contained the mixture of radically curable compounds as the backbone resin, from which reactive resin components, reactive resin systems and fastening compositions were then prepared and their properties (viscosity, dispensing forces, load values) were examined.

Reactive resin master batches, reactive resins, reactive resin components and two-component reactive resin systems containing the compounds (IId), (IIc), (VId), (VIIIe), (IIId), (VIIIa) and (IIIe) as the backbone resins were initially used for this purpose. These served as a basis for producing the mixtures according to the invention as the backbone resin. These compounds and the reactive resins, reactive resin components and two-component reactive resin systems produced therewith are also used for comparison, as explained in more detail below.

Compounds (IId), (IIc), (VId), (VIIIe), (IIId), (VIIIa) and (IIIe)

1. Production of Reactive Resin Master Batch 1 with Compound (IId)

1396 g of hydroxypropyl methacrylate were provided in a 2 liter laboratory glass reactor with an internal thermometer and stirrer shaft and were mixed with 0.2 g of phenothiazine (D Prills; Allessa Chemie), 0.5 g of 4-hydroxy-2,2,6,6-tetramethyl-piperidinyl-1-oxyl (TEMPOL; Evonik Degussa GmbH) and 0.4 g of dioctyltin dilaurate (TIB KAT 200; TIB Chemicals). The batch was heated to 70° C. Subsequently, 603 g of methylene di(phenyl isocyanate) (Lupranat MIS; BASF SE) were added dropwise with stirring at 200 rpm for 45 minutes. The mixture was then stirred at 80° C. for a further 45 minutes.

This produced the reactive resin master batch 1, containing 65 wt. % of the compound (IId) as a backbone resin and 35 wt. % of hydroxypropyl methacrylate based on the total weight of the reactive resin master batch.

The compound (IId) has the following structure:

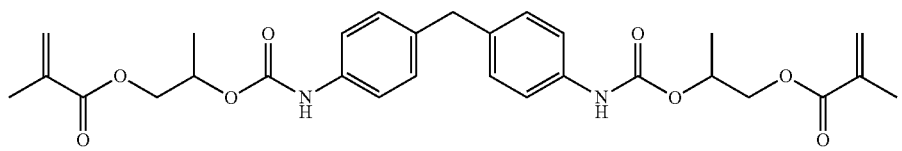 [SMILES: C=C(C)C(=O)OCC(C)OC(=O)Nc1ccc(Cc2ccc(NC(=O)OC(C)COC(=O)C(=C)C)cc2)cc1]

2. Production of Reactive Resin Master Batch 2 with Compound (IIc)

1542 g of hydroxypropyl methacrylate were provided in a 2 liter laboratory glass reactor with an internal thermometer and stirrer shaft and were mixed with 0.24 g of phenothiazine (D Prills; Allessa Chemie), 0.60 g of 4-hydroxy-2,2,6,6-tetramethyl-piperidinyl-1-oxyl (TEMPOL; Evonik Degussa GmbH) and 0.40 g of dioctyltin dilaurate (TIB KAT 216; TIB Chemicals). The batch was heated to 80° C. Subsequently, 500 g of toluene-2,4-diisocyanate (TCI Deutschland GmbH) were added with stirring at 200 rpm for 45 minutes. The mixture was then stirred at 80° C. for a further 180 minutes.

This produced the reactive resin master batch 2, containing 65 wt. % of the compound (IIc) as a backbone resin and 35 wt. % of hydroxypropyl methacrylate based on the total weight of the reactive resin master batch.

The compound (IIc) has the following structure:

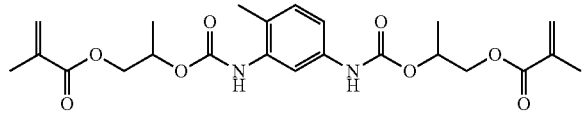 [SMILES: C=C(C)C(=O)OCC(C)OC(=O)Nc1ccc(C)c(NC(=O)OC(C)COC(=O)C(=C)C)c1]

3. Production of Reactive Resin Master Batch 3 with Compound (VId)

218 g of hydroxypropyl methacrylate and 669 g of 1,4-butanediol dimethacrylate (BDDMA; Evonik AG) were provided in a 2 liter laboratory glass reactor with an internal thermometer and stirrer shaft and were mixed with 0.13 g of phenothiazine (D Prills; Allessa Chemie), 0.37 g of 4-hydroxy-2,2,6,6-tetramethyl-piperidinyl-1-oxyl (TEMPOL; Evonik Degussa GmbH), 0.23 g of dioctyltin dilaurate (TIB KAT 216; TIB Chemicals) and 67 g of trimethylolpropane. The batch was heated to 100° C. Subsequently, 380 g of MDI were added dropwise with stirring at 200 rpm for 70 minutes. The mixture was then stirred at 100° C. for a further 300 minutes. Finally, 666 g of hydroxypropyl methacrylate were added.

This produced the reactive resin master batch 3, containing the compound (VId) as a backbone resin, hydroxypropyl methacrylate and 1,4-butanediol dimethacrylate in a ratio of 1:1:1.

The product (compound (VId)) has an oligomer distribution, the oligomer with a repeating unit having the following structure:

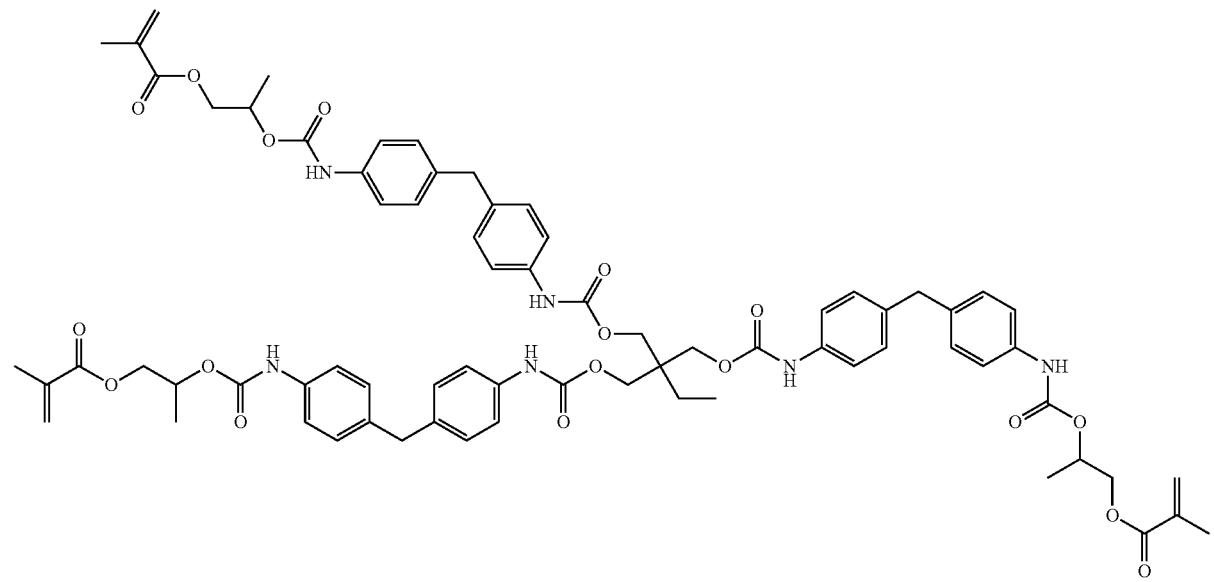

4. Reactive Resin Master Batch 4 with Compound (VIIIe)

A reactive resin master batch containing 80 wt. % of compound (VIIIe) and 20 wt. % of 1,4-butanediol dimethacrylate, based on the total weight of the reactive resin master batch, is commercially available under the trade name Ecocryl 05345 (bisphenol A diglycidyl ether dimethacrylate; Hexion Inc.).

The compound (VIIIe) has the following structure:

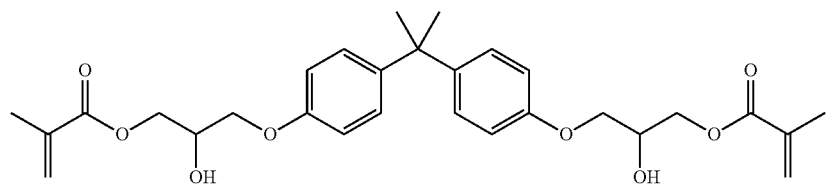 [SMILES: C=C(C)C(=O)OCC(O)COc1ccc(C(C)(C)c2ccc(OCC(O)COC(=O)C(=C)C)cc2)cc1]

5. Production of Reactive Resin Master Batch 5 with Compound (IIIa)

1444 g of hydroxypropyl methacrylate were provided in a 2 liter laboratory glass reactor with an internal thermometer and stirrer shaft and were mixed with 0.23 g of phenothiazine (D Prills; Allessa Chemie), 0.56 g of 4-hydroxy-2,2,6,6-tetramethyl-piperidinyl-1-oxyl (TEMPOL; Evonik Degussa GmbH) and 0.38 g of dioctyltin dilaurate (TIB KAT 216; TIB Chemicals). The batch was heated to 80° C. Subsequently, 455 g of hexamethylene-1,6-diisocyanate (Sigma Aldrich) were added dropwise with stirring (200 rpm) for 45 minutes. The mixture was then stirred at 80° C. for a further 60 minutes.

This produced the reactive resin master batch 5, containing 65 wt. % of the compound (IIIa) as a backbone resin and 35 wt. % of hydroxypropyl methacrylate based on the total weight of the reactive resin master batch.

The compound (IIIa) has the following structure:

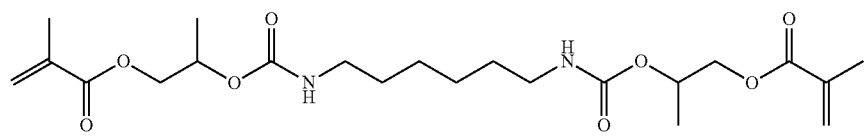 [SMILES: C=C(C)C(=O)OCC(C)OC(=O)NCCCCCCNC(=O)OC(C)COC(=O)C(=C)C]

6. Production of Reactive Resin Master Batch 6 with Compound (VIIIa)

645 g of 1,4-butanediol diglycidylether (Araldite DY 026 SP; Huntsmann Advanced Materials), 518 g of methacrylic acid (BASF SE), 6.0 g of tetraethylammonium bromide (Merck KGaA Deutschland), 0.23 g of phenothiazine (D Prills; Allessa Chemie) and 0.25 g of 4-hydroxy-2,2,6,6-tetramethyl-piperidinyl-1-oxyl (TEMPOL; Evonik Degussa GmbH) were provided in a 2 liter laboratory glass reactor with an internal thermometer and stirrer shaft. The batch was heated to 100° C. for 240 minutes.

This produced the reactive resin master batch 6, containing the compound (VIIIa) as a backbone resin. The compound has the following structure:

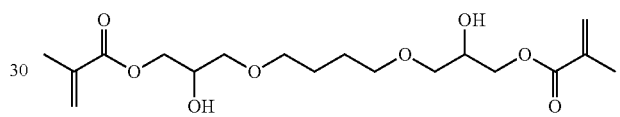

7. Production of Reactive Resin Master Batch 7 with Compound (IIIe)

1433 g of hydroxypropyl methacrylate were provided in a 2 liter laboratory glass reactor with an internal thermometer and stirrer shaft and were mixed with 0.21 g of phenothiazine (D Prills; Allessa Chemie), 0.53 g of 4-hydroxy-2,2,6,6-tetramethyl-piperidinyl-1-oxyl (TEMPOL; Evonik Degussa GmbH) and 0.36 g of dioctyltin dilaurate (TIB KAT 200; TIB Chemicals). The batch was heated to 80° C. Subsequently, 566 g of isophorone diisocyanate (Sigma Aldrich) were added dropwise with stirring (200 rpm) for 45 minutes. The mixture was then stirred at 80° C. for a further 120 minutes.

This produced the reactive resin master batch 7, containing 65 wt. % of the compound (IIIe) as a backbone resin and 35 wt. % of hydroxypropyl methacrylate based on the total weight of the reactive resin master batch.

The compound (IIIe) has the following structure:

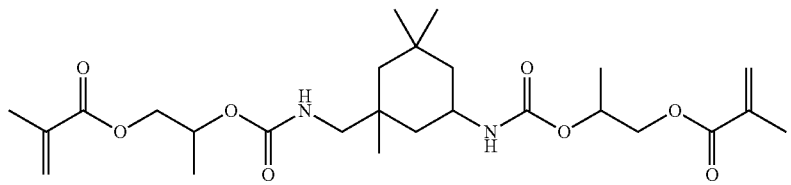 [SMILES: C=C(C)C(=O)OCC(C)OC(=O)NCC1(C)CC(NC(=O)OC(C)COC(=O)C(=C)C)CC(C)(C)C1]

From the above reactive resin master batches 1 to 7, reactive resins were produced as follows:
Production of Reactive Resins
8. Reactive Resin 1

10.1 g of 4-hydroxy-2,2,6,6-tetramethylpiperidinyl-1-oxyl (TEMPOL: Evonik Industries AG) and 38.5 g of di-isopropanol-p-toluidine (BASF SE) were added to a mixture of 1103 g of reactive resin master batch 1, 330 g of hydroxypropyl methacrylate and 717 g of 1,4-butanediol dimethacrylate (BDDMA; Evonik AG).

9. Reactive Resin 2

301 g of reactive resin master batch 2 were mixed with 91 g of hydroxypropyl methacrylate and 196 g of 1,4-butanediol dimethacrylate (BDDMA; Evonik AG). 2.75 g of 4-hydroxy-2,2,6,6-tetramethyl-piperidinyl-1-oxyl (TEMPOL; Evonik Degussa GmbH) and 10.5 g of di-iso-propanol-p-toluidine (BASF SE) were added to this mixture.

10. Reactive Resin 3

6.0 g of 4-hydroxy-2,2,6,6-tetramethylpiperidinyl-1-oxyl (TEMPOL; Evonik Industries AG) and 22.8 g of di-isopropanol-p-toluidine (BASF SE) were added to 1271 g of reactive resin master batch 3.

11. Reactive Resin 4

9.0 g of 4-hydroxy-2,2,6,6-tetramethylpiperidinyl-1-oxyl (TEMPOL; Evonik Industries AG) and 40.3 g of di-isopropanol-p-toluidine (BASF SE) were added to a mixture of 937 g of reactive resin master batch 4, 751 g of hydroxypropyl methacrylate and 563 g of 1,4-butanediol dimethacrylate (BDDMA; Evonik AG).

12. Reactive Resin 5

6.4 g of 4-hydroxy-2,2,6,6-tetramethylpiperidinyl-1-oxyl (TEMPOL; Evonik Industries AG) and 24.5 g of di-isopropanol-p-toluidine (BASF SE) were added to a mixture of 702 g of reactive resin master batch 5, 210 g of hydroxypropyl methacrylate and 456 g of 1,4-butanediol dimethacrylate (BDDMA; Evonik AG).

13. Reactive Resin 6

6.5 g of 4-hydroxy-2,2,6,6-tetramethylpiperidinyl-1-oxyl (TEMPOL; Evonik Industries AG) and 26.25 g of di-isopropanol-p-toluidine (BASF SE) were added to a mixture of 489 g of reactive resin master batch 6, 489 g of hydroxypropyl methacrylate and 489 g of 1,4-butanediol dimethacrylate (BDDMA; Evonik AG).

14. Reactive Resin 7

3.3 g of 4-hydroxy-2,2,6,6-tetramethylpiperidinyl-1-oxyl (TEMPOL; Evonik Degussa GmbH) and 14.0 g of di-isopropanol-p-toluidine (BASF SE) were added to a mixture of 401 g of reactive resin master batch 7, 120 g of hydroxypropyl methacrylate and 261 g of 1,4-butanediol dimethacrylate (BDDMA; Evonik AG).

As a result, the reactive resins 1 to 7 were obtained.
Comparative Compounds 1, 2 and 3

As a further comparison, in particular with the reactive resin master batches, reactive resins, reactive resin components and reactive resin systems containing the mixtures according to the invention as the backbone resin, comparative reactive resin master batches, comparative reactive resins, comparative reactive resin components and comparative two-component reactive resin systems containing comparative compounds 1, 2 and 3 were produced.

15. Production of Comparative Reactive Resin Master Batch 1 with Comparative Compound 1

30.9 g of hydroxypropyl methacrylate were provided in a 250 ml laboratory glass flask with an internal thermometer and stirrer shaft and were mixed with 0.018 g of phenothiazine (D Prills; Allessa Chemie), 0.044 g of 4-hydroxy-2,2,6,6-tetramethyl-piperidinyl-1-oxyl (TEMPOL; Evonik Industries GmbH), 0.032 g of dioctyltin dilaurate (TIB KAT200; TIB Chemicals) and 12.69 g of 1,6-hexanediol (TCI Deutschland GmbH). The batch was heated to 80° C. Subsequently, 53.7 g Lupranat® MIS (mixture of 2,4'- and 4,4'-diphenylmethylene diisocyanat (MDI; BASF Polyurethanes GmbH)) were added dropwise with stirring (200 rpm) for 45 minutes. The mixture was then stirred at 80° C. for a further 45 minutes. Subsequently, 52.6 g of hydroxypropyl methacrylate were added.

This produced the comparative reactive resin master batch 1, containing 65 wt. % of the comparative compound 1 as a backbone resin and 35 wt. % of hydroxypropyl methacrylate based on the total weight of the reactive resin master batch was obtained.

The comparative compound 1 has the following structure and thus contains structural elements of the compounds (IId) and (IIId):

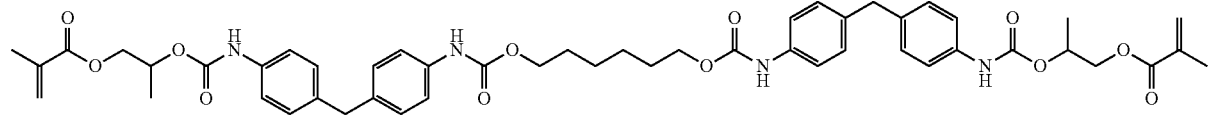 [SMILES: C=C(C)C(=O)OCC(C)OC(=O)Nc1ccc(Cc2ccc(NC(=O)OCCCCCCOC(=O)Nc3ccc(Cc4ccc(NC(=O)OC(C)COC(=O)C(=C)C)cc4)cc3)cc2)cc1]

16. Production of Comparative Reactive Resin 1

2.3 g of 4-hydroxy-2,2,6,6-tetramethylpiperidinyl-1-oxyl (TEMPOL; Evonik Industries AG) and 8.75 g of di-isopropanol-p-toluidine (BASF SE) were added to 489 g of reactive resin master batch 1.

As a result, comparative reactive resin 1 was obtained.

17. Production of Comparative Reactive Resin Master Batch 2 with Comparative Compound 31 g of hydroxypropyl methacrylate were provided in a 250 ml laboratory glass flask with an internal thermometer and stirrer shaft and were mixed with 0.02 g of phenothiazine, 0.05 g of 4-hydroxy-2,2,6,6-tetramethyl-piperidinyl-1-oxyl (TEMPOL; Evonik Industries GmbH), 0.04 g of dioctyltin dilaurate (TIB KAT 200; TIB Chemicals) and 11.9 g of resorcinol. The batch was heated to 120° C. Subsequently, 54 g Lupranat® MIS (mixture of 2,4'- and 4,4'-diphenylmethylene diisocyanat (MDI; BASF Polyurethanes GmbH)) were added dropwise with stirring (200 rpm) for 45 minutes. The mixture was then stirred at 120° C. for a further 480 minutes. Subsequently, 53 g of hydroxypropyl methacrylate were added.

This produced the comparative reactive resin master batch 2, containing 65 wt. % of the comparative compound 2 as a backbone resin and 35 wt. % of hydroxypropyl methacrylate based on the total weight of the reactive resin master batch was obtained.

The comparative compound 2 has the following structure and contains structural elements of the compounds (IId) and (IIc):

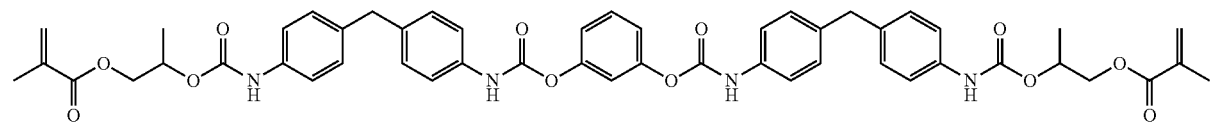 [SMILES: C=C(C)C(=O)OCC(C)OC(=O)Nc1ccc(Cc2ccc(NC(=O)Oc3cccc(OC(=O)Nc4ccc(Cc5ccc(NC(=O)OC(C)COC(=O)C(=C)C)cc5)cc4)c3)cc2)cc1]

18. Production of Comparative Reactive Resin 2

1.2 g of 4-hydroxy-2,2,6,6-tetramethylpiperidinyl-1-oxyl (TEMPOL; Evonik Industries AG) and 4.6 g of di-isopropanol-p-toluidine (BASF SE) were added to a mixture of 133 g of comparative reactive resin master batch 2, 40 g of hydroxypropyl methacrylate and 86 g of 1,4-butanediol dimethacrylate (BDDMA; Evonik AG).

As a result, comparative reactive resin 2 was obtained.

19. Production of Comparative Reactive Resin Master Batch 3 with Comparative Compound 3

191 g of bisphenol A diglycidyl having an average viscosity (Epilox® A 19-03; viscosity at 25° C. (DIN 53 015) of 10,000-14,000 mPa·s; LEUNA-Harze GmbH), 49 g of methacrylic acid (BASF SE), 70 g of 1,4-butanediol dimethacrylate (BDDMA; Evonik AG), 38 g of adipic acid, 2.2 g of tetraethylammonium bromide (Merck KGaA Deutschland), 0.05 g of phenothiazine (D Prills; Allessa Chemie) and 0.05 g of 4-hydroxy-2,2,6,6-tetramethyl-piperidinyl-1-oxyl (TEMPOL; Evonik Industries GmbH) were provided in a 500 ml laboratory glass flask with an internal thermometer and stirrer shaft. The batch was heated to 100° C. for 240 minutes.

This produced the comparative reactive resin master batch 3, containing 80 wt. % of the comparative compound 3 as a backbone resin and 20 wt. % of 1,4-butanediol dimethacrylate.

The comparative compound 3 has the following structure and contains structural elements of the compounds (VIIIe) and (VIIIa):

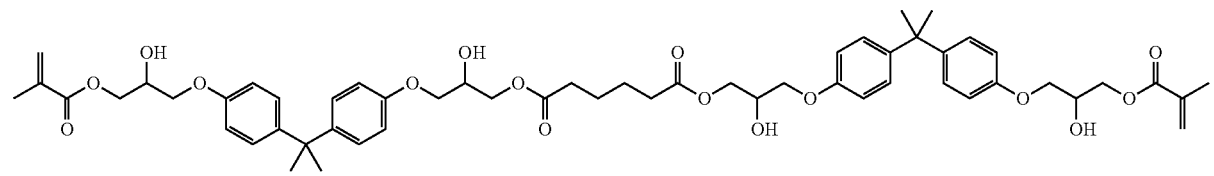 [SMILES: C=C(C)C(=O)OCC(O)COc1ccc(C(C)(C)c2ccc(OCC(O)COC(=O)CCCCC(=O)OCC(O)COc3ccc(C(C)(C)c4ccc(OCC(O)COC(=O)C(=C)C)cc4)cc3)cc2)cc1]

20. Production of Comparative Reactive Resin 3

2.0 g of 4-hydroxy-2,2,6,6-tetramethylpiperidinyl-1-oxyl (TEMPOL; Evonik Industries AG) and 8.8 g of di-isopropanol-p-toluidine (BASF SE) were added to a mixture of 204 g of comparative reactive resin master batch 3, 163 g of hydroxypropyl methacrylate and 122 g of 1,4-butanediol methacrylate.

As a result, comparative reactive resin 3 was obtained.

21. Mixtures of Reactive Resins 1 to 7 (Backbone Resins 8-19)

From the above reactive resins 1 to 7, mixtures were produced to obtain reactive resins each containing a mixture of the radically curable compounds as a backbone resin.

For mixing the reactive resins, more precisely for the mixing ratio, the following was applied:

In order to produce a reactive resin mixture which is to be compared with a comparative reactive resin containing a specific comparative compound, the molar ratios of the structural elements of the difunctional starting materials present in the particular comparative compound used to produce the comparative compound were applied. For example, comparative compound 1 (structural elements of compound (IId) and compound (IIId)) contains two methylene di(phenylene) groups and one hexylene group as structural elements. In order to produce a corresponding reactive resin mixture for which a reactive resin is intended to be used as comparison with comparative compound 1, a reactive resin with a compound having a methylene di(phenylene) group as a structural element (reactive resin 1 with compound (IId)) and another reactive resin with a compound having a hexylene group as a structural element (reactive resin 5 with compound (IIId)) were selected. Accordingly, for the mixture of reactive resins 1 and 5 corresponding to the molar ratio of structural elements present in the comparative compound (methylene di(phenylene) group:hexylene group=2:1), a molar ratio of compound (IId) to compound (IIId) (IId:IIId=2:1) for the reactive resin mixture to be compared was also selected. Analogously, comparative mixtures were produced for the other comparative compounds.

In order to measure the viscosity of reactive resin mixtures, reactive resin components produced therefrom and the dispensing forces of two-component reactive resin systems produced from the reactive resin components, mixtures of reactive resins 1, 2, 4, 5 and 6 were produced at room temperature according to the compositions shown schematically in Table 1. Production was carried out by mixing at least two of the above-mentioned reactive resins in a boiler having a mixer.

TABLE 1

Schematic composition of the reactive resin mixtures for measuring the viscosity of the reactive resin mixtures, reactive resin components produced therefrom and the dispensing forces of two-component reactive resin systems produced from the reactive resin components

| | Mixture | | | | | | |
|---|---|---|---|---|---|---|---|
| | 1 | 2 | 3 | 4 | 5 | 6 | 7 |
| | | | | Resulting reactive resin | | | |
| | 8 | 9 | 10 | 11 | 12 | 13 | 14 |
| Reactive resins used | 1 + 5 | 1 + 2 | 4 + 6 | 1 + 6 | 4 + 5 | 1 + 4 + 5 | 1 + 4 + 6 |
| Compounds | IId + IIId | IId + IIc | VIIIe + VIIIa | IId + VIIIa | VIIIe + IIId | IId + VIIIe + IIId | IId + VIIIe + VIIIa |
| Corresponding comparative compound(s) | 1 | 2 | 3 | 1 and 3 | 1 and 3 | 1 and 3 | 1 and 3 |

In order to measure the bond strengths of fastening compositions that contain the mixtures according to the invention, mixtures of reactive resins 1, 2, 3, 4, 5, 6 and 7 were produced at room temperature according to the compositions shown schematically in Table 2. Production was carried out by mixing at least two of the above-mentioned reactive resins in a boiler having a mixer.

TABLE 2

Schematic composition of the reactive resin mixtures for measuring the load values of the mortar compositions of two-component reactive resin systems with the reactive resin mixtures according to the invention

| Mixture | 8 | 9 | 10 | 11 | 12 |
|---|---|---|---|---|---|
| Resulting reactive resin | 15 | 16 | 17 | 18 | 19 |
| Reactive resins used | 1 + 2 | 4 + 3 | 5 + 7 | 4 + 6 | 7 + 4 + 6 |
| Compounds | IId + IIc | VIIIe + VId | IIId + IIIe | VIIIe + VIIIa | IIIe + VIIIe + VIIIa |

These reactive resin mixtures 1 to 12 (also referred to as reactive resins 8 to 19) resulted in the backbone resins 8 to 19, which are present as a mixture of two or three compounds.

22. Production of Reactive Resin Components 1 to 19

In order to produce the reactive resin components 1 to 7, 354 g in each case of the reactive resins 1 to 7 produced above, and in order to produce the reactive resin components 8 to 19, 354 g in each case of the reactive resin mixtures 1 to 12 produced above, were mixed with 185 g of Secar® 80 (Kemeos Inc.), 27 g of Cab-O-Sil® TS-720 (Cabot Corporation) and 335 g of quartz sand F32 (Quarzwerke GmbH) in a dissolver under vacuum using a PC laboratory system dissolver of the LDV 0.3-1 type. The mixtures were stirred for 8 minutes at 3500 rpm under vacuum (pressure ≤ 100 mbar) with a 55 mm dissolver disk and an edge scraper.

23. Production of Comparative Reactive Resin Components 1 to 3

354 g in each case of comparative reactive resin 1, 2 and 3 were mixed with 185 g of Secar® 80 (Kemeos Inc.), 27 g of Cab-O-Sil® TS-720 (Cabot Corporation) and 335 g of quartz sand F32 (Quarzwerke GmbH) in a dissolver under vacuum mixed using a PC laboratory dissolver of the LDV 0.3-1 type. The mixtures were stirred for 8 minutes at 3500 rpm under vacuum (pressure≤100 mbar) with a 55 mm dissolver disk and an edge scraper.

The reactive resin components 1 to 19 and comparative reactive resin components 1 to 3 thus produced served as the A component in the production of two-component reactive resin systems.

24. Production of the Two-Component Reactive Resin Systems 1 to 19

In order to produce the two-component reactive resin systems 1 to 7 containing the reactive resins 1 to 7 and the two-component reactive resin systems 8 to 19 containing the reactive resins 8 to 19 (reactive resin mixtures 1 to 12), the respective reactive resin components (component (A)) and in each case the hardener component (component (B)) of the commercially available product HIT-HY 110 (Hilti Aktiengesellschaft; batch number: 1610264) were filled into plastic cartridges (Ritter GmbH; volume ratio A:B=3:1) with the inner diameters 47 mm (component (A)) or 28 mm (component (B)).

In order to determine the influence of the backbone resins according to the invention (mixtures of radically curable compounds) on the properties of reactive resins, reactive resin components, two-component reactive resin systems and the cured fastening compositions, in particular the viscosity and the dispensing forces of reactive resin components and two-component reactive resin systems and the bond strengths of cured fastening compositions, the viscosity of reactive resins and reactive resin components, each containing the backbone resins according to the invention, and the dispensing forces of two-component reactive resin systems produced therefrom, and the bond strengths of the cured fastening materials, were measured and compared with the measured values of the formulations containing only a radically curable compound as a backbone resin and of the comparative formulations containing the comparative backbone resins.

Measurement of the Dynamic Viscosity of Reactive Resins 1, 2, 4, 5, 6, 8, 9 and 10 and Comparative Reactive Resins 1, 2 and 3

The dynamic viscosity of reactive resins 1, 5 and 8 and comparative reactive resin 1 (Table 3), of reactive resins 1, 2 and 9 and comparative reactive resin 2 (Table 4), of reactive resins 4, 6 and 10 and comparative reactive resin 3 (Table 5) was measured using a cone-plate measuring system according to DIN 53019. The diameter of the cone was 60 mm and the opening angle was 1°. Measurement was carried out at a constant shear rate of 150/s and a temperature of 23° C. (unless indicated otherwise in the measurement data). The measuring time was 180 s and a measuring point was generated every second. In order to reach the shear rate, a ramp of 0-150/s with a duration of 120 s was connected upstream. Since these are Newtonian liquids, a linear evaluation over the measuring stage was made at a constant shear rate of 150/s over the measuring stage and the viscosity was determined. In each case three measurements were made; the corresponding mean values are indicated in Table 3.

Measurement of the Dynamic Viscosity of Reactive Resin Components 1, 2, 4, 5, 6, 8, 9 and 10 and Comparative Reactive Resin Components 1, 2 and 3

The dynamic viscosity of reactive resin components 1, 5 and 8 and comparative reactive resin component 1 (Table 3), of reactive resin components 1, 2 and 9 and comparative reactive resin component 2 (Table 4), of reactive resin components 4, 6 and 10 and of comparative reactive resin component 3 (Table 5) was measured using a plate-plate measuring system according to DIN 53019. The diameter of the plate was 20 mm and the gap distance was 3 mm. In order to prevent the sample from leaking out of the gap, a limiting ring made of Teflon and placed at a distance of 1 mm from the top plate was used. The measuring temperature was 25° C. The method consisted of three stages: 1. Low shear, 2. High shear, 3. Low shear. In the first stage, shearing took place for 3 minutes at 0.5/s. In the second stage, the shear rate was increased logarithmically from 0.8/s to 100/s in 8 steps of 15 seconds each. The individual stages in this case were: 0.8/s; 1.724/s; 3.713/s; 8/s; 17.24/s; 37.13/s; 80/s; 100/s. The third stage was a repetition of the first stage. At the end of each stage, the viscosities were read. Tables 3 to 5 show the value of the second stage at 100/s. In each case three measurements were made; the corresponding mean values are indicated in Tables 3 to 5.

Measurement of Dispensing Forces:

In order to measure the dispensing forces at 25° C., the reactive resin systems were heated to 25° C. The cartridges were ejected on a material testing machine from Zwick with a force transducer (test range up to 10 kN) via a static mixer (mixer HIT-RE-M; Hilti Aktiengesellschaft) at a constant speed of 100 mm/min over a distance of 45 mm and the average force occurring in the process was measured.

In one example, compositions having urethane methacrylate-based backbone resins were compared with one another. For this purpose, the dynamic viscosity of reactive resin 1 having an aromatic urethane methacrylate as the backbone resin, of reactive resin 5 having an aliphatic urethane methacrylate as the backbone resin and of comparative reactive resin 1 having the comparative compound 1, which contains the structural elements of the two urethane methacrylates, as the backbone resin is compared with the dynamic viscosity of reactive resin 8 (mixture 1 of aromatic and aliphatic urethane methacrylate). Furthermore, the dynamic viscosity of the reactive resin components produced from the above-mentioned reactive resins and the dispensing forces of the corresponding reactive resin systems were compared with one another. The results are shown in Table 3.

TABLE 3

Results of the measurement of the dynamic viscosity of reactive resins 1, 5 and 8, of comparative reactive resin 1, of the reactive resin components 1, 5 and 8 and comparative reactive resin component 1 produced therefrom and of the dispensing forces of reactive resin systems 1, 5 and 8 and of comparative reactive resin system 1

| Reactive resin used | Dynamic viscosity reactive resin [mPa · s] (23° C.) | Dynamic viscosity reactive resin component [Pa · s] (25° C.) | Dispensing forces two-component reactive resin system [N] |
|---|---|---|---|
| Reactive resin 1 | 43 | 13.6 | 972 |
| Reactive resin 5 | 25 | 11.2 | 937 |
| Reactive resin 8 (Reactive resin mixture 1) | 35 | 14.2 | 910 |
| Comparative reactive resin 1 | 287 | 31.4 | 1748 |

In another example, compositions having other urethane methacrylate-based backbone resins were compared with one another. For this purpose, the dynamic viscosity of reactive resin 1 having an aromatic urethane methacrylate as the backbone resin, of reactive resin 2 also having an aromatic urethane methacrylate as the backbone resin and of comparative reactive resin 2 having the comparative compound 2, which contains the structural elements of the two urethane methacrylates, as the backbone resin is compared with the dynamic viscosity of reactive resin 9 (mixture 2 of two aromatic urethane methacrylates). Furthermore, the dynamic viscosity of the reactive resin components produced from the above-mentioned reactive resins and the dispensing forces of the corresponding reactive resin systems were compared with one another.

The results are shown in Table 4.

TABLE 4

Results of the measurement of the dynamic viscosity of reactive resins 1, 2 and 9, of comparative reactive resin 2, of the reactive resin components 1, 2 and 9 and comparative reactive resin component 2 produced therefrom and of the dispensing forces of reactive resin systems 1, 2 and 9 and of comparative reactive resin system 2

| Reactive resin used | Dynamic viscosity reactive resin [mPa · s] (23° C.) | Dynamic viscosity reactive resin component [Pa · s] (25° C.) | Dispensing force two-component reactive resin system [N] |
|---|---|---|---|
| Reactive resin 1 | 43 | 13.6 | 972 |
| Reactive resin 2 | 39 | 10.8 | 1036 |
| Reactive resin 9 (Reactive resin mixture 2) | 40 | 11.2 | 855 |
| Comparative reactive resin 2 | 173 | 18.6 | 912 |

In another example, compositions having glycidyl methacrylate-based backbone resins were compared with one another. For this purpose, the dynamic viscosity of reactive resin 4 having an aromatic glycidyl methacrylate as the backbone resin, of reactive resin 6 having an aliphatic glycidyl methacrylate as the backbone resin and of comparative reactive resin 3 having the comparative compound 3, which contains the structural elements of the two glycidyl methacrylates, as the backbone resin is compared with the dynamic viscosity of reactive resin 10 (mixture 3 of aromatic and aliphatic glycidyl methacrylate). Furthermore, the dynamic viscosity of the reactive resin components produced from the above-mentioned reactive resins and the dispensing forces of the corresponding reactive resin systems were compared with one another. The results are shown in Table 5.

TABLE 5

Results of the measurement of the dynamic viscosity of reactive resins 4, 6 and 10, of comparative reactive resin 3, of the reactive resin components 4, 6 and 10 and comparative reactive resin component 3 produced therefrom and of the dispensing forces of reactive resin systems 4, 6, 10 and of comparative reactive resin system 3

| Reactive resin used | Dynamic viscosity reactive resin [mPa · s] (23° C.) | Dynamic viscosity reactive resin component [Pa · s] (25° C.) | Dispensing force two-component reactive resin system [N] |
|---|---|---|---|
| Reactive resin 4 | 45 | 12.1 | 1035 |
| Reactive resin 6 | 22 | 9.3 | 785 |
| Reactive resin 10 (Reactive resin mixture 3) | 33 | 12.6 | 844 |
| Comparative reactive resin 3 | 151 | 20.1 | 1240 |

In another example, reactive resin components having a glycidyl methacrylate-based backbone resin and a urethane methacrylate-based backbone resin were compared with one another. For this purpose, the dispensing forces of reactive resin system 1 having an aromatic urethane methacrylate as the backbone resin, of reactive resin system 6 having an aliphatic glycidyl methacrylate as the backbone resin and of comparative reactive resin systems 1 and 3 having comparative compounds 1 and 3, respectively, as the backbone resin were compared with the dispensing force of reactive resin system 11 (mixture 4 of aromatic and aliphatic glycidyl methacrylate as the backbone resin). Furthermore, the dispensing forces of reactive resin system 4 having an aromatic glycidyl methacrylate as the backbone resin, of reactive resin system 5 having a urethane methacrylate as the backbone resin and of comparative reactive resin systems 1 and 3 having comparative compounds 1 and 3, respectively, as the backbone resin were compared with the dispensing force of reactive resin system 12 (mixture 5 of aromatic glycidyl methacrylate and an aliphatic urethane methacrylate). The results are shown in Table 6.

TABLE 6

Results of the measurement of the dispensing forces of the reactive resin systems 1, 4, 5, 6, 11 and 12 and of the comparative reactive resin systems 1 and 3

| Reactive resin used | Dispensing force two-component reactive resin system [N] | Reactive resin used | Dispensing force two-component reactive resin system [N] |
|---|---|---|---|
| Reactive resin 1 | 972 | Reactive resin 4 | 1035 |
| Reactive resin 6 | 785 | Reactive resin 5 | 937 |
| Reactive resin 11 (Reactive resin mixture 4) | 945 | Reactive resin 12 (Reactive resin mixture 5) | 920 |
| Comparative reactive resin 1 | 1748 | Comparative reactive resin 1 | 1748 |
| Comparative reactive resin 3 | 1240 | Comparative reactive resin 3 | 1240 |

In another example, the dispensing forces of compositions having a glycidyl methacrylate-based backbone resin and a urethane methacrylate-based backbone resin were compared with one another. For this purpose, on the one hand the dispensing force of reactive resin system 1 with an aromatic urethane methacrylate as the backbone resin, of reactive resin system 4 with an aromatic glycidyl methacrylate as the backbone resin, of reactive resin system 5 with an aliphatic urethane methacrylate as the backbone resin and of comparative reactive resin systems 1 and 3 are compared with comparative compounds 1 and 3, respectively, as the backbone resin is compared with the dispensing force of reactive resin system 13 (mixture 6 of aromatic and aliphatic urethane methacrylate and aromatic glycidyl methacrylate). Furthermore, the dispensing force of reactive resin system 1 having an aromatic urethane methacrylate as the backbone resin, of reactive resin system 4 having an aromatic glycidyl methacrylate as the backbone resin, of reactive resin system 6 having an aliphatic glycidyl methacrylate as the backbone resin and of comparative reactive resin systems 1 and 3 having comparative compounds 1 and 3, respectively, as the backbone resin is compared with the dispensing force of reactive resin system 14 (mixture 7 of aromatic and aliphatic glycidyl methacrylate and aromatic urethane methacrylate). The results are shown in Table 7.

TABLE 7

Results of the measurement of the dispensing forces of the reactive resin systems 1, 4, 5, 6, 13 and 14 and of the comparative reactive resin systems 1 and 3

| Reactive resin used | Dispensing force two-component reactive resin system [N] | Reactive resin used | Dispensing force two-component reactive resin system [N] |
| --- | --- | --- | --- |
| Reactive resin 1 | 972 | Reactive resin 1 | 972 |
| Reactive resin 4 | 1035 | Reactive resin 4 | 1035 |
| Reactive resin 5 | 937 | Reactive resin 6 | 785 |
| Reactive resin 13 (Reactive resin mixture 6) | 897 | Reactive resin 14 (Reactive resin mixture 7) | 828 |
| Comparative reactive resin 1 | 1748 | Comparative reactive resin 1 | 1748 |
| Comparative reactive resin 3 | 1240 | Comparative reactive resin 3 | 1240 |

The results show a significant reduction in the viscosity of the reactive resin components and a reduction in the dispensing forces of the two-component reactive resin systems, which each contain a mixture of low-viscosity compounds according to the invention as the backbone resin, compared with the viscosity of the reactive resin components and the dispensing forces of the two-component reactive resin systems, which contain the comparative compounds and only one compound as the backbone resin. In particular, a mixture of an aromatic urethane methacrylate compound and an aliphatic urethane methacrylate compound results in a significant reduction in the dispensing force of the two-component reactive resin system containing this mixture as the backbone resin, compared with the dispensing force of the two-component reactive resin system containing the corresponding comparative compound as the backbone resin.

Measurement of Bond Strength

In order to measure the bond strength (load values) of the cured fastening compositions, M12 anchor threaded rods were inserted into boreholes in C20/25 concrete having a diameter of 14 mm and a borehole depth of 72 mm, which boreholes were filled with the reaction resin mortar compositions. The bond strength was determined by centric extension of the anchor threaded rods. In each case, five anchor threaded rods were placed and after 24 hours of curing, the bond strength was determined. In this case the commercially available product Hilti HIT-HY 110 (Hilti Aktiengesellschaft) served as a comparison. The fastening compositions were ejected out of the cartridges via a static mixer (HIT-RE-M mixer Hilti Aktiengesellschaft) and injected into the boreholes.

The bond strength was measured under the following borehole conditions:

A1: It is a cleaned, dust-free, dry, hammer-drilled borehole. Placing, curing and extending take place at room temperature. The temperature of the two-component reactive resin system or the fastening composition is 20° C. when setting.

In the following, the bond strengths of fastening compositions containing the backbone resins according to the invention (mixture of two or three radically curable compounds) are compared with the bond strengths of fastening compositions containing the corresponding radically curable compound as a single compound as the backbone resin, and with the bond strengths of the commercially available product Hilti HIT-HY 110. In order to show that the influence of the backbone resins according to the invention on the bond strengths of a fastening composition containing said resins is not additively composed of the backbone resins, which in each case comprise only one radically curable compound, theoretical bond strengths were calculated for the mixtures of the bond strengths of the fastening compositions having the backbone resins, each comprising only a radically curable compound.

In one example, fastening compositions having two urethane methacrylate-based backbone resins were compared with one another. For this purpose, the bond strength of fastening composition 1 having an aromatic urethane methacrylate as the backbone resin, of fastening composition 2 having another aromatic urethane methacrylate as the backbone resin and of Hilti HIT-HY 110 was compared with the bond strength of fastening composition 15 (mixture 8 of aromatic urethane methacrylates). The results are shown in Table 8. Table 8 also shows the mean bond strength calculated from the bond strengths of fastening compositions 1 and 2 (theoretical bond strength 1+2=mean value of bond strength 1 and bond strength 2).

TABLE 8

Results of the measurement of the bond strength of fastening compositions 1, 2, 15 and of Hilti HIT-HY 110 as well as the theoretical bond strength 1 + 2

| | Bond strength [N/mm$^2$] |
| --- | --- |
| Fastening composition 1 | 20.1 |
| Fastening composition 2 | 20.1 |
| Fastening composition 15 | 21.4 |
| Theoretical bond strength 1 + 2 | 20.1 |
| Hilti HIT-HY 110 | 20.7 |

In another example, fastening compositions having two urethane methacrylate-based backbone resins were compared with one another. For this purpose, the bond strength of fastening composition 4 having an aromatic urethane methacrylate as the backbone resin, of fastening composition 3 having a branched aromatic urethane methacrylate as the backbone resin and of Hilti HIT-HY 110 was compared with the bond strength of fastening composition 16 (mixture 9 of two aromatic urethane methacrylates). The results are shown in Table 9. Table 9 also shows the mean bond strength calculated from the bond strengths of fastening compositions 3 and 4 (theoretical bond strength 3+4=mean value of bond strength 3 and bond strength 4).

TABLE 9

Results of the measurement of the bond strength of fastening compositions 4, 3, 16 and of Hilti HIT-HY 110 as well as the theoretical bond strength 3 + 4

| | Bond strength [N/mm²] |
|---|---|
| Fastening composition 4 | 17.5 |
| Fastening composition 3 | 22.0 |
| Fastening composition 16 | 22.8 |
| Theoretical bond strength 3 + 4 | 19.8 |
| HIT-HY 110 | 20.7 |

In another example, fastening compositions having two urethane methacrylate-based backbone resins were compared with one another. For this purpose, the bond strength of fastening composition 7 having a cycloaliphatic urethane methacrylate as the backbone resin, of fastening composition 5 having a linear aliphatic urethane methacrylate as the backbone resin and of Hilti HIT-HY 110 was compared with the bond strength of fastening composition 17 (mixture 10 of a cycloaliphatic and a linear aliphatic urethane methacrylate). The results are shown in Table 10. Table 10 also shows the mean bond strength calculated from the bond strengths of fastening compositions 5 and 7 (theoretical bond strength 5+7=mean value of bond strength 5 and bond strength 7).

TABLE 10

Results of the measurement of the bond strength of fastening compositions 7, 5, 17 and of Hilti HIT-HY 110 as well as the theoretical bond strength 5 + 7

| | Bond strength [N/mm²] |
|---|---|
| Fastening composition 7 | 14.9 |
| Fastening composition 5 | 14.2 |
| Fastening composition 17 | 16.9 |
| Theoretical bond strength 5 + 7 | 14.6 |
| HIT-HY 110 | 20.7 |

In another example, fastening compositions having two glycidyl methacrylate-based backbone resins were compared with one another. For this purpose, the bond strength of fastening composition 4 having an aromatic glycidyl methacrylate as the backbone resin, of fastening composition 6 having a linear aliphatic glycidyl methacrylate as the backbone resin and of Hilti HIT-HY 110 was compared with the bond strength of fastening composition 18 (mixture 11 of an aromatic and a linear aliphatic glycidyl methacrylate). The results are shown in Table 11. Table 11 also shows the mean bond strength calculated from the bond strengths of fastening compositions 4 and 6 (theoretical bond strength 4+6=mean value of bond strength 4 and bond strength 6).

TABLE 11

Results of the measurement of the bond strengths of fastening compositions 4, 6, 18 and of Hilti HIT-HY 110 as well as the theoretical bond strength 4 + 6

| | Bond strength [N/mm²] |
|---|---|
| Fastening composition 4 | 15.5 |
| Fastening composition 6 | 9.7 |
| Fastening composition 18 | 17.4 |
| Theoretical bond strength 4 + 6 | 12.6 |
| Hilti HIT-HY 110 | 20.7 |

In another example, fastening compositions having two glycidyl methacrylate-based backbone resins and one urethane methacrylate-based backbone resin were compared with one another. For this purpose, the bond strength of fastening composition 4 having an aromatic glycidyl methacrylate as the backbone resin, of fastening composition 6 having a linear aliphatic glycidyl methacrylate as the backbone resin, of fastening composition 6 having a cycloaliphatic urethane methacrylate as the backbone resin and of Hilti HIT-HY 110 was compared with the bond strength of fastening composition 19 (mixture 19 of an aromatic and a linear aliphatic glycidyl methacrylate and a cycloaliphatic urethane methacrylate). The results are shown in Table 12. Table 12 also shows the mean bond strength calculated from the bond strengths of fastening compositions 4, 6 and 7 (theoretical bond strength 4+6+7=mean value of bond strength 4, bond strength 6 and bond strength 7).

TABLE 12

Results of the measurement of the bond strengths of fastening compositions 7, 4, 6, 19 and of Hilti HIT-HY 110 as well as the theoretical bond strength 4 + 6 + 7

| | Bond strength [N/mm²] |
|---|---|
| Fastening composition 7 | 14.9 |
| Fastening composition 4 | 17.1 |
| Fastening composition 6 | 10.4 |
| Fastening composition 19 | 15.9 |
| Theoretical bond strength 4 + 6 + 7 | 14.1 |
| Hilti HIT-HY 110 | 20.7 |

The results show that the bond strengths of cured fastening compositions which each contain a mixture of two radically curable compounds as the backbone resin are higher than the bond strength of the cured comparative fastening composition from Hilti HIT-HY 110.

Furthermore, it can be seen from the tables that the theoretical bond strengths are lower than the bond strengths of cured fastening compositions which each contain a mixture of two radically curable compounds as the backbone resin. This demonstrates the synergistic effect of the backbone resins according to the invention, i.e. the mixtures according to the invention of at least two radically curable compounds.

The invention claimed is:
1. A reactive resin system, comprising:
a reactive resin component (A), comprising
at least two radically curable compounds each having a structure of at least one of compounds of the general formula (I), compounds of the general formula (V) and compounds of the general formula (VII)

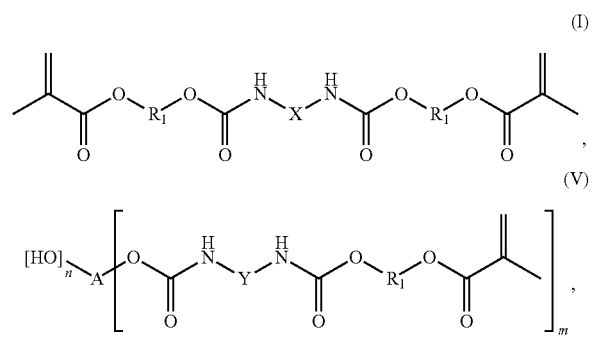

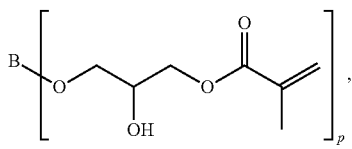
(VII)

in which
each $R_1$ is independently a branched or linear aliphatic $C_1$-$C_{15}$ alkylene group,
A is a linear or branched aliphatic $C_3$-$C_{10}$ alkylene group,
B is a linear, branched or cyclic aliphatic hydrocarbon group or an aromatic hydrocarbon group,
X is a divalent linear, branched or cyclic aliphatic or aromatic hydrocarbon group, or a group Z of the formula

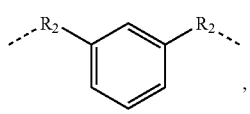
(Z)

in which $R_2$ is a divalent branched or linear aliphatic $C_1$-$C_6$ alkylene group,
Y is an aromatic hydrocarbon group,
n is a whole number greater than or equal to 0,
m is a whole number greater than or equal to 3, and
p is a whole number greater than or equal to 2,
an inhibitor,
an accelerator, and
optionally a reactive diluent, and
a hardener component (B) comprising an initiator,
wherein at least one of the components (A) or (B) contains an inorganic aggregate having a particle size minimum diameter of about 50 nm and an amount of 30-90°,(0 wt. %.

2. The reactive resin system according to claim 1, wherein X is a divalent aromatic $C_6$-$C_{20}$ hydrocarbon group or a divalent linear, branched or cyclic aliphatic hydrocarbon group.

3. The reactive resin system according to claim 1, wherein X is a divalent $C_6$-$C_{20}$ aromatic hydrocarbon group containing one or two benzene rings which are optionally alkyl substituted.

4. The reactive resin system according to claim 1, wherein B is an aliphatic hydrocarbon group which is optionally hydroxy and/or alkyl substituted.

5. The reactive resin system according to claim 4, wherein the aliphatic hydrocarbon group B is a linear or branched $C_2$-$C_{12}$ alkylene group.

6. The reactive resin system according to claim 1, wherein B is an aromatic hydrocarbon group.

7. The reactive resin system according to claim 1, wherein p is 2 or 3.

8. The reactive resin system according to claim 1, wherein Y is a $C_6$-$C_{20}$ aromatic hydrocarbon group.

9. The reactive resin system according to claim 1, wherein Y contains one or two benzene rings, which are optionally alkyl substituted.

10. The reactive resin system according to claim 1, wherein A is a trivalent or higher-valency-group, as obtained by removing the hydroxyl groups from a trifunctional or higher-function alcohol.

11. The reactive resin system according to claim 1, wherein n=0, 1, or 2 and m 3, 4, or 5.

12. The reactive resin system according to claim 1, wherein n=0 or 1 and m=3, 4, or 5, where n+m=4 or 5.

13. The reactive resin system according to claim 1, wherein $R_1$ is a divalent linear or branched $C_1$-$C_6$ alkylene group.

14. A method of preparing the reactive resin system according to claim 1 for construction purposes, the method comprising:
combining the reactive resin component (A) and the hardener component (B).

15. A method for chemical fastening of an anchor in a borehole for construction purposes, the method comprising:
chemically fastening an anchor in a borehole with the reactive resin system according to claim 1.

* * * * *

UNITED STATES PATENT AND TRADEMARK OFFICE
CERTIFICATE OF CORRECTION

| | | |
|---|---|---|
| PATENT NO. | : 11,655,320 B2 | Page 1 of 1 |
| APPLICATION NO. | : 16/938536 | |
| DATED | : May 23, 2023 | |
| INVENTOR(S) | : Georg Nickerl et al. | |

It is certified that error appears in the above-identified patent and that said Letters Patent is hereby corrected as shown below:

On the Title Page

Column 2, Line 13 in OTHER PUBLICATIONS currently reads:
"file for GAS registry"
And should read:
--file for CAS registry--;

Page 2, Column 1, Line 11 in OTHER PUBLICATIONS currently reads:
"of Contemporagy Dental Adhesives"
And should read:
--of Contemporary Dental Adhesives--;

In the Claims

Column 56, Line 47, Claim 1, currently reads:
"(A), comprising"
And should read:
--(A), comprising:--;

Column 57, Lines 41-42, Claim 1, currently reads:
"of 30-90°,(0 wt. %."
And should read:
--of 30-90 % wt. %.--; and Column 58, Line 28, Claim 11, currently reads:
"and m 3, 4, or 5."
And should read:
--and m = 3, 4, or 5.--.

Signed and Sealed this
Twenty-ninth Day of August, 2023

*Katherine Kelly Vidal*
Katherine Kelly Vidal
*Director of the United States Patent and Trademark Office*